US012614130B2

(12) United States Patent
Mimura et al.

(10) Patent No.: US 12,614,130 B2
(45) Date of Patent: Apr. 28, 2026

(54) SIMULATION DEVICE

(71) Applicant: NTT DOCOMO, INC., Chiyoda-ku (JP)

(72) Inventors: Tomohiro Mimura, Chiyoda-ku (JP); Satoshi Kawasaki, Chiyoda-ku (JP); Shin Ishiguro, Chiyoda-ku (JP)

(73) Assignee: NTT DOCOMO, INC., Chiyoda-ku (JP)

( * ) Notice: Subject to any disclaimer, the term of this patent is extended or adjusted under 35 U.S.C. 154(b) by 255 days.

(21) Appl. No.: 18/251,647

(22) PCT Filed: Dec. 8, 2021

(86) PCT No.: PCT/JP2021/045111
§ 371 (c)(1),
(2) Date: May 3, 2023

(87) PCT Pub. No.: WO2022/138164
PCT Pub. Date: Jun. 30, 2022

(65) Prior Publication Data
US 2023/0409990 A1     Dec. 21, 2023

(30) Foreign Application Priority Data
Dec. 23, 2020     (JP) ................................. 2020-213515

(51) Int. Cl.
*G06Q 10/04*     (2023.01)
*G06Q 10/20*     (2023.01)
*G06Q 50/40*     (2024.01)

(52) U.S. Cl.
CPC ............. *G06Q 10/04* (2013.01); *G06Q 10/20* (2013.01); *G06Q 50/40* (2024.01)

(58) Field of Classification Search
None
See application file for complete search history.

(56) References Cited

U.S. PATENT DOCUMENTS

| | | | | |
|---|---|---|---|---|
| 2009/0296990 A1* | 12/2009 | Holland | .................... | G06T 7/60 |
| | | | | 382/106 |
| 2019/0019118 A1* | 1/2019 | Xi | .......................... | G06Q 50/40 |
| 2019/0295108 A1* | 9/2019 | Mitsumaki | ............. | G06Q 10/02 |
| 2019/0318275 A1* | 10/2019 | Sakurada | ............... | G06Q 10/02 |

(Continued)

FOREIGN PATENT DOCUMENTS

| | | |
|---|---|---|
| JP | 2002-304498 A | 10/2002 |
| JP | 2014-41 475 A | 3/2014 |
| JP | 2016-151940 A | 8/2016 |

OTHER PUBLICATIONS

International Search Report mailed on Jan. 18, 2022 in PCT/JP2021/045111 filed on Dec. 8, 2021, (2 pages).

(Continued)

*Primary Examiner* — Peter D Nolan
*Assistant Examiner* — Jacob Kent Besteman-Street
(74) *Attorney, Agent, or Firm* — Oblon, McClelland, Maier & Neustadt, L.L.P.

(57)     ABSTRACT

A simulation device is a device that simulates movement of a vehicle between a plurality of ports in a shared traffic service and includes a calculation unit that calculates a work time in a relocation port that is a port to be a target of relocation of the vehicle and simulates the relocation based on the work time.

5 Claims, 19 Drawing Sheets

(56)          References Cited

U.S. PATENT DOCUMENTS

| | | | |
|---|---|---|---|
| 2019/0340543 A1* | 11/2019 | Gerenstein | G06Q 10/04 |
| 2020/0160709 A1* | 5/2020 | Ramot | G06Q 10/047 |
| 2020/0278214 A1* | 9/2020 | Arkin | G01C 21/3438 |
| 2021/0103888 A1* | 4/2021 | Mohamed | G06Q 10/0838 |
| 2022/0292413 A1* | 9/2022 | Li | G06F 17/11 |

OTHER PUBLICATIONS

International Preliminary Report on Patentability and Written Opinion issued on Jul. 6, 2023 in PCT/JP2021/045111 filed on Dec. 8, 2021, 5 pages.

* cited by examiner

| PORT ID | AREA ID | POSITION INFORMATION | NUMBER OF VEHICLES PARKABLE | NUMBER OF VEHICLES AVAILABLE |
|---------|---------|----------------------|----------------------------|------------------------------|
| Pa1 | A1 | (x1, y1) | 20 | 7 |
| Pa2 | A1 | (x2, y2) | 10 | 3 |
| Pa3 | A1 | (x3, y3) | 15 | 14 |
| Pa4 | A1 | (x4, y4) | 18 | 10 |
| ⋮ | ⋮ | ⋮ | ⋮ | ⋮ |

(b)

| VEHICLE ID | VEHICLE STATE | PORT ID | REMAINING BATTERY LEVEL INFORMATION |
|------------|---------------|---------|-------------------------------------|
| V1 | PARKED | Pa1 | 27.5 |
| V2 | MOVING | - | 21.4 |
| V3 | PARKED | Pa2 | 34.8 |
| V4 | RELOCATED | - | 26.3 |
| ⋮ | ⋮ | ⋮ | ⋮ |

(c)

| VEHICLE CARRIER TRAILER ID | CARRIABLE NUMBER OF VEHICLES | VEHICLE CARRIER TRAILER STATE | POSITION INFORMATION | COLLECTION PORT ID | ALLOCATION PORT ID | NUMBER OF VEHICLES RELOCATED |
|----------------------------|------------------------------|-------------------------------|----------------------|--------------------|--------------------|------------------------------|
| D1 | 20 | MOVING | (xd1,yd1) | Pa1 | Pa4 | 20 |
| D2 | 30 | COLLECTING | (xd2,yd2) | Pa3 | Pa7 | 25 |
| ⋮ | ⋮ | ⋮ | ⋮ | ⋮ | ⋮ | ⋮ |

*Fig.4*

| PORT ID | DAY TYPE | CLOCK TIME | AVERAGE NUMBER OF RENTED VEHICLES |
|---|---|---|---|
| ... | ... | ... | ... |
| Pa1 | WEEKDAY | 7:00 | 7 |
| Pa1 | WEEKDAY | 7:03 | 3 |
| Pa1 | WEEKDAY | 7:06 | 0 |
| Pa1 | WEEKDAY | 7:09 | 3 |
| ... | ... | ... | ... |
| Pa2 | WEEKDAY | 7:00 | 2 |
| Pa2 | WEEKDAY | 7:03 | 3 |
| Pa2 | WEEKDAY | 7:06 | 8 |
| ... | ... | ... | ... |

*Fig.5*

| RENTAL PORT ID | DAY TYPE | CLOCK TIME | RETURN PORT ID | | | | |
| --- | --- | --- | --- | --- | --- | --- | --- |
| | | | Pa1 | Pa2 | Pa3 | Pa4 | ⋮ |
| Pa1 | WEEKDAY | 7:00 | 7 | 0 | 0 | 1 | ⋮ |
| Pa1 | WEEKDAY | 8:00 | 4 | 0 | 1 | 3 | ⋮ |
| Pa1 | WEEKDAY | 9:00 | 0 | 0 | 3 | 0 | ⋮ |
| Pa1 | WEEKDAY | 10:00 | 3 | 0 | 0 | 0 | ⋮ |
| ⋮ | ⋮ | ⋮ | ⋮ | ⋮ | ⋮ | ⋮ | ⋮ |

*Fig.6*

| RENTAL PORT ID | RETURN PORT ID | | | | |
| --- | --- | --- | --- | --- | --- |
| | Pa1 | Pa2 | Pa3 | Pa4 | ⋮ |
| Pa1 | 0.2 | 0.9 | 0.3 | 2.2 | ⋮ |
| Pa2 | 1.2 | 0.1 | 0.3 | 0.7 | ⋮ |
| Pa3 | 0.4 | 0.5 | 0.2 | 0.7 | ⋮ |
| Pa4 | 2.1 | 0.6 | 1.1 | 0.2 | ⋮ |
| ⋮ | ⋮ | ⋮ | ⋮ | ⋮ | ⋮ |

*Fig. 7*

| RENTAL PORT ID | RETURN PORT ID | | | | |
| --- | --- | --- | --- | --- | --- |
| | Pa1 | Pa2 | Pa3 | Pa4 | ⋮ |
| Pa1 | 0.5 | 1.3 | 0.6 | 2.2 | ⋮ |
| Pa2 | 1.2 | 0.3 | 0.6 | 1.0 | ⋮ |
| Pa3 | 0.6 | 0.8 | 0.4 | 1.0 | ⋮ |
| Pa4 | 2.1 | 0.8 | 1.2 | 0.5 | ⋮ |
| ⋮ | ⋮ | ⋮ | ⋮ | ⋮ | ⋮ |

*Fig.14*

| PORT ID | DAY TYPE | CLOCK TIME | AVERAGE NUMBER OF RENTED VEHICLES |
|---------|----------|------------|-----------------------------------|
| . . . | . . . | . . . | . . . |
| Pa1 | WEEKDAY | 7:00 | 7 |
| Pa1 | WEEKDAY | 7:03 | 3 |
| Pa1 | WEEKDAY | 7:06 | 0 |
| Pa1 | WEEKDAY | 7:09 | 3 |
| . . . | . . . | . . . | . . . |
| VPa | WEEKDAY | 7:00 | 5 |
| VPa | WEEKDAY | 7:03 | 6 |
| VPa | WEEKDAY | 7:06 | 2 |
| . . . | . . . | . . . | . . . |

*Fig.15*

| RENTAL PORT ID | DAY TYPE | CLOCK TIME | Pa1 | Pa2 | Pa3 | Pa4 | ... | VPa |
|---|---|---|---|---|---|---|---|---|
| | | | | | RETURN PORT ID | | | |
| Pa1 | WEEKDAY | 7:00 | 7 | 0 | 0 | 1 | ... | 6 |
| Pa1 | WEEKDAY | 8:00 | 4 | 0 | 1 | 3 | ... | 2 |
| Pa1 | WEEKDAY | 9:00 | 0 | 0 | 3 | 0 | ... | 4 |
| Pa1 | WEEKDAY | 10:00 | 3 | 0 | 0 | 0 | ... | 1 |
| ... | ... | ... | ... | ... | ... | ... | ... | ... |

Fig. 16

| RENTAL PORT ID | RETURN PORT ID | | | | | |
|---|---|---|---|---|---|---|
| | Pa1 | Pa2 | Pa3 | Pa4 | ... | VPa |
| Pa1 | 0.2 | 0.8 | 0.3 | 2.2 | ... | 3.2 |
| Pa2 | 1.2 | 0.1 | 0.3 | 0.7 | ... | 2.2 |
| Pa3 | 0.4 | 0.5 | 0.2 | 0.7 | ... | 4.1 |
| Pa4 | 2.1 | 0.6 | 1.1 | 0.2 | ... | 3.7 |
| ... | ... | ... | ... | ... | ... | ... |

*Fig. 17*

| RENTAL PORT ID | RETURN PORT ID | | | | | |
|---|---|---|---|---|---|---|
| | Pa1 | Pa2 | Pa3 | Pa4 | ... | VPa |
| Pa1 | 0.5 | 1.3 | 0.6 | 2.2 | ... | 3.2 |
| Pa2 | 1.2 | 0.3 | 0.6 | 1.0 | ... | 2.0 |
| Pa3 | 0.6 | 0.8 | 0.4 | 1.0 | ... | 4.2 |
| Pa4 | 2.1 | 0.8 | 1.2 | 0.5 | ... | 3.5 |
| ... | ... | ... | ... | ... | ... | ... |

*Fig.18*

| PORT ID | VEHICLE ID | REMAINING BATTERY LEVEL INFORMATION |
|---------|------------|-------------------------------------|
| Pa1 | V1 | 27.5 |
| Pa1 | V5 | 22.1 |
| Pa1 | V6 | 21.9 |
| Pa1 | V9 | 25.8 |
| ... | ... | ... |

SIMULATION DEVICE

TECHNICAL FIELD

The present disclosure relates to a simulation device.

BACKGROUND ART

In recent years, a shared traffic service in which users share a vehicle such as a bicycle has attracted attention. In the shared traffic service, a plurality of ports for parking vehicles are provided. Each user rents a vehicle from a desired port and returns the vehicle to a desired port. Since the number of vehicles rented from each port is not necessarily the same as the number of vehicles returned to the port, the number of vehicles parked in each port may vary. In this case, vehicles are relocated from a port having a large number of vehicles to a port having a small number of vehicles.

The number of vehicles parked in each port may change over time. Therefore, it is required to predict a change in the number of vehicles in each port. Patent Literature 1 discloses an operation plan preparation system that determines the number of parking frames per station and the number of initially allocated vehicles per station in a car sharing system, and that evaluates the business performance by reproducing the state transition when the car sharing system is operated with the number of parking frames and the number of initially allocated vehicles by state transition simulation.

CITATION LIST

Patent Literature

Patent Literature 1: Japanese Unexamined Patent Publication No. 2016-151940

SUMMARY OF INVENTION

Technical Problem

The operation plan preparation system described in Patent Literature 1 takes into consideration the transportation (relocation) to move vehicles to another station when vehicles are unevenly located and the number of persons who carry out the relocation. However, there is room for improvement in relocation simulation.

The present disclosure describes a simulation device capable of improving the simulation accuracy of vehicle movement.

Solution to Problem

A simulation device according to an aspect of the present disclosure is a device that simulates movement of a vehicle between a plurality of ports in a shared traffic service. The simulation device includes a calculation unit that calculates a work time in a relocation port that is a port to be a target of relocation of the vehicle and simulates the relocation based on the work time.

In this simulation device, the relocation is simulated based on the work time in the relocation port. Since the work time may vary depending on the relocation port, the simulation of relocation can be realized with high accuracy by considering the work time in the relocation port. As a result, the simulation accuracy of the movement of the vehicle can be improved.

Advantageous Effects of Invention

According to the present disclosure, the simulation accuracy of the movement of the vehicle can be improved.

BRIEF DESCRIPTION OF DRAWINGS

FIG. 3(a) is a diagram showing an example of port information. FIG. 3(b) is a diagram showing an example of vehicle information. FIG. 3(c) is a diagram showing an example of vehicle carrier trailer information.

FIG. 4 is a diagram showing an example of rented vehicles number information.

FIG. 5 is a diagram showing an example of movement information.

FIG. 6 is a diagram showing an example of battery usage information.

FIG. 7 is a diagram showing an example of usage time information.

FIG. 14 is a diagram showing an example of rented vehicles number information used in the simulation of the target area.

FIG. 15 is a diagram showing an example of movement information used in the simulation of the target area.

FIG. 16 is a diagram showing an example of battery usage information used in the simulation of the target area.

FIG. 17 is a diagram showing an example of usage time information used in the simulation of the target area.

FIG. 18 is a diagram showing an example of a list of vehicles available.

DESCRIPTION OF EMBODIMENTS

In the following, embodiments of the present disclosure will be described with reference to the drawings. It should be noted that in the description of the drawings, the same components are designated with the same reference signs, and the redundant description is omitted.

Figure 1:
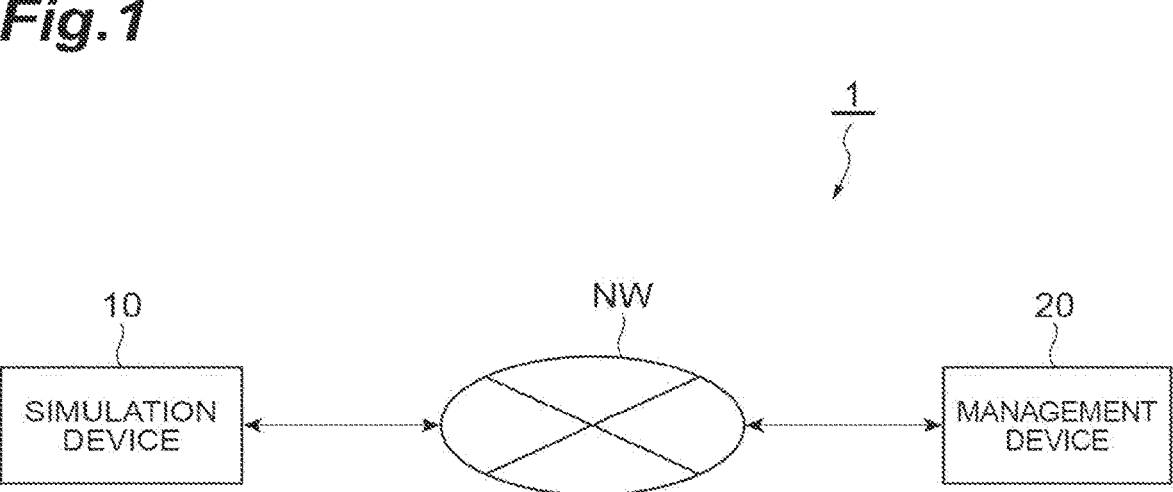
FIG. 1 is a schematic configuration diagram of a simulation system including a simulation device according to an embodiment.
Figure 2:
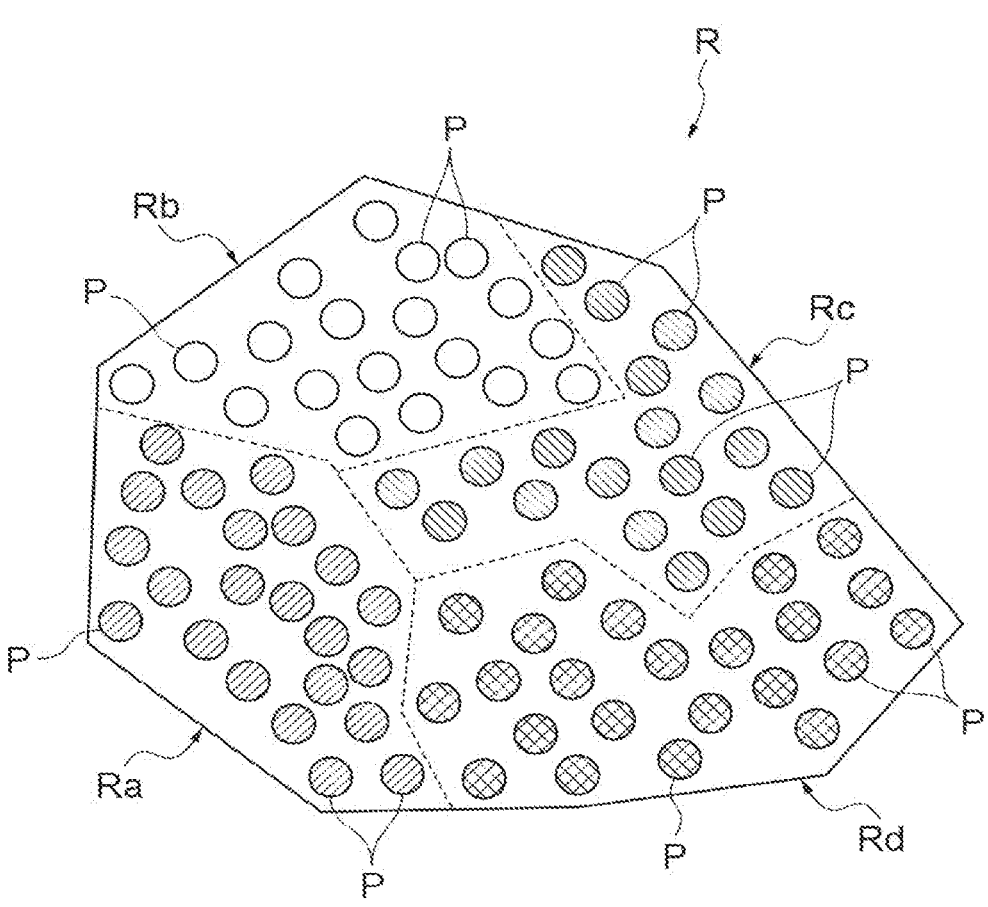
FIG. 2 is a diagram for explaining a divided area.

A configuration of a simulation system including a simulation device according to an embodiment will be described with reference to FIGS. 1 to 7. FIG. 1 is a schematic configuration diagram of a simulation system including a simulation device according to an embodiment. FIG. 2 is a diagram for explaining a divided area. FIG. 3(a) is a diagram showing an example of port information. FIG. 3(b) is a diagram showing an example of vehicle information. FIG. 3(c) is a diagram showing an example of vehicle carrier trailer information. FIG. 4 is a diagram showing an example of rented vehicles number information. FIG. 5 is a diagram showing an example of movement information. FIG. 6 is a diagram showing an example of battery usage information. FIG. 7 is a diagram showing an example of usage time information.

The simulation system 1 shown in FIG. 1 is a system for simulating the movements of vehicles in a shared traffic service. The shared traffic service is a sharing service in which users share vehicles, and is, for example, a one-way micro electric vehicle (MEV) sharing system. Examples of vehicles include bicycles, automobiles, motorcycles, and scooters. In the shared traffic service, multiple ports are provided. The port is a space (parking lot) for parking a vehicle. The port is also referred to as a station.

Each user rents a vehicle from a desired port and returns the vehicle to a desired port. The port to which the vehicle is returned may be different from or the same as the port from which the vehicle is rented. Therefore, since the number of rented vehicles and the number of returned vehicles do not necessarily coincide with each other in each port, the number of vehicles parked in the port (the number of parked vehicles) may be biased between ports. In the simulation system 1, the relocation of vehicles between ports is simulated so that the number of vehicles available in each port does not become short and does not exceed the number of vehicles that can be parked. The relocation is performed, for example, by a vehicle carrier trailer, such as a truck, transporting vehicles between ports.

It should be noted that a relocation area is set in the shared traffic service. The relocation area is an area in which the relocation of vehicles is performed and includes a plurality of ports. In other words, the vehicles are relocated between ports included (provided) in the relocation area. The relocation area is divided into a plurality of divided areas. In the example shown in FIG. 2, the relocation area R is divided into a divided area Ra, a divided area Rb, a divided area Rc, and a divided area Rd. The relocation area is divided so that each divided area includes a plurality of ports P. The relocation area is divided using an arbitrary technique. For example, the relocation area may be divided by administrative district or business operator.

The simulation system 1 includes a simulation device 10 and a management device 20. The simulation device 10 and the management device 20 can communicate with each other via a network NW. The network NW may be constituted by either wired or wireless. Examples of the network NW include a mobile communication network, the Internet, and a wide area network (WAN).

The simulation device 10 is a device (simulator) that simulates the movement of a vehicle between the plurality of ports included in the relocation area in the shared traffic service. An example of the simulation device 10 is an information processing device such as a server device.

The management device 20 is a device that manages the shared traffic service. The management device 20 manages information relating to ports and vehicles used in the shared traffic service. The management device 20 stores, for example, port information, vehicle information, and vehicle carrier trailer information.

As shown in FIG. 3(a), the port information (each record) includes a port ID (identifier), an area ID, position information, the number of vehicles that can be parked, and the number of vehicles available. The port ID is information for uniquely identifying a port. The area ID is information for uniquely identifying a divided area, and indicates a divided area to which a port identified by the port ID belongs. The position information is information indicating the position of the port identified by the port ID. As the position information, for example, latitude and longitude are used. The number of vehicles that can be parked indicates the number of vehicles that can be parked in the port identified by the port ID. The number of vehicles that can be parked is set, for example, to a value obtained by multiplying the number of racks by a permissible rate. The permissible rate is a value representing the degree to which parking is permissible for the number of racks. The number of vehicles available is the number of vehicles available in the port identified by the port ID, for example, the number of vehicles parked in the port.

As shown in FIG. 3(b), the vehicle information (each record) includes a vehicle ID, a vehicle state, a port ID, and a remaining battery level. The vehicle ID is information for uniquely identifying a vehicle. The vehicle state indicates the state of the vehicle identified by the vehicle ID. Examples of vehicle states include "moving", "parked", and "relocated". The port ID indicates a port where the vehicle identified by the vehicle ID is parked. The remaining battery level indicates the remaining battery level of the vehicle identified by the vehicle ID. As the remaining battery level, for example, the state of charge (SOC) [%] can be used. The vehicle information may further include type information indicating the type of the vehicle. Examples of the vehicle type include a bicycle, an automobile, a motorcycle, and a scooter.

As shown in FIG. 3(c), the vehicle carrier trailer information (each record) includes a vehicle carrier trailer ID, the carriable number of vehicles, a vehicle carrier trailer state, position information, a collection port ID, an allocation port ID, and the number of vehicles relocated. The vehicle carrier trailer ID is information for uniquely identifying a vehicle carrier trailer. The carriable number of vehicles is the number of vehicles that can be accommodated in the vehicle carrier trailer identified by the vehicle carrier trailer ID. The vehicle carrier trailer state indicates the state of the vehicle carrier trailer identified by the vehicle carrier trailer ID. Examples of the vehicle carrier trailer state include "collecting", "moving", and "allocating". The "collecting" state is a state in which the vehicle carrier trailer is stopped near the collection port in order to collect the vehicle. The collection port is a port in which a vehicle to be relocated (target vehicle) is collected. The "allocating" state is a state in which the vehicle carrier trailer is stopped near the allocation port in order to allocate the vehicle. The allocation port is a port in which the collected vehicle is allocated.

The position information is information indicating the position of the vehicle carrier trailer identified by the vehicle carrier trailer ID. The collection port ID is a port ID of a collection port. The allocation port ID is a port ID of an allocation port. The number of vehicles relocated is the number of vehicles to be relocated (moved) from the collection port to the allocation port, and is the number of vehicles to be relocated by the vehicle carrier trailer identified by the vehicle carrier trailer ID.

The management device 20 further stores statistical information relating to the usage record of the vehicle. Examples of statistical information include rented vehicles number information, movement information, battery usage information, and usage time information.

As shown in FIG. 4, the rented vehicles number information is information indicating an average value of the number of vehicles rented at the same clock time (time zone)

on the same day type of day in each port. The rented vehicles number information (each record) includes a port ID, a day type, a clock time, and the average number of rented vehicles. The day type indicates a type of usage date. The type of the usage date is set, for example, for each usage date on which the usage conditions of the vehicles are similar. Examples of the day type include a weekday and a holiday. The average number of rented vehicles is an average value of the number of vehicles rented at the same clock time on a day having the day type indicated by the day type information in the port identified by the port ID. The average number of rented vehicles is calculated based on past usage records. In the example shown in FIG. 4, a record of rented vehicles number information is generated every three minutes. For example, when the clock time is 7:00, the average number of rented vehicles may be an average value of the number of vehicles rented between 7:00 and 7:03.

As shown in FIG. 5, the movement information is information indicating the number of times of movement between two ports at the same clock time (time zone) on the same type of usage date. The movement information (each record) includes a rental port ID, a day type, a clock time, a return port ID, and the number of times of movement. The rental port ID is a port ID of a rental port. The rental port is a port from which a vehicle is rented. The return port ID is a port ID of a return port. The return port is a port to which the vehicle is returned. The number of times of movement indicates the number of times the vehicle has moved from the rental port to the return port at the same clock time (time zone) on the same day type of day. The clock time at which the vehicle has moved may be the clock time at which the vehicle has been rented (rental time), the clock time at which the vehicle has been returned (return time), or an intermediate clock time between the rental time and the return time. The number of times of movement is calculated based on past usage records. The number of times of movement may be a cumulative value or an average value.

In the example shown in FIG. 5, a record of movement information is generated every hour. For example, when the clock time is 7:00, the number of times of movement may be the number of times a vehicle has moved from the rental port to the return port between 7:00 and 8:00.

As shown in FIG. 6, the battery usage information is information indicating the average battery usage in the movement between two ports. The battery usage information (each record) includes a rental port ID, a return port ID, and a battery usage. The battery usage is the average usage of a battery that is used from when a vehicle is rented from the port identified by the rental port ID until the vehicle is returned to the port identified by the return port ID. As the battery usage, SOC [%] can be used. The battery usage is calculated based on past usage records.

As shown in FIG. 7, the usage time information is information indicating an average time (usage time) during which a user has used a vehicle for a movement between two ports. In other words, the usage time information indicates an average time required for a movement between two ports. The usage time information (each record) includes a rental port ID, a return port ID, and a usage time. The usage time is an average time from when a vehicle is rented from the port identified by the rental port ID to when the vehicle is returned to the port identified by the return port ID. The usage time can be expressed in units of one hour. The usage time is calculated from past usage records.

Figure 8:
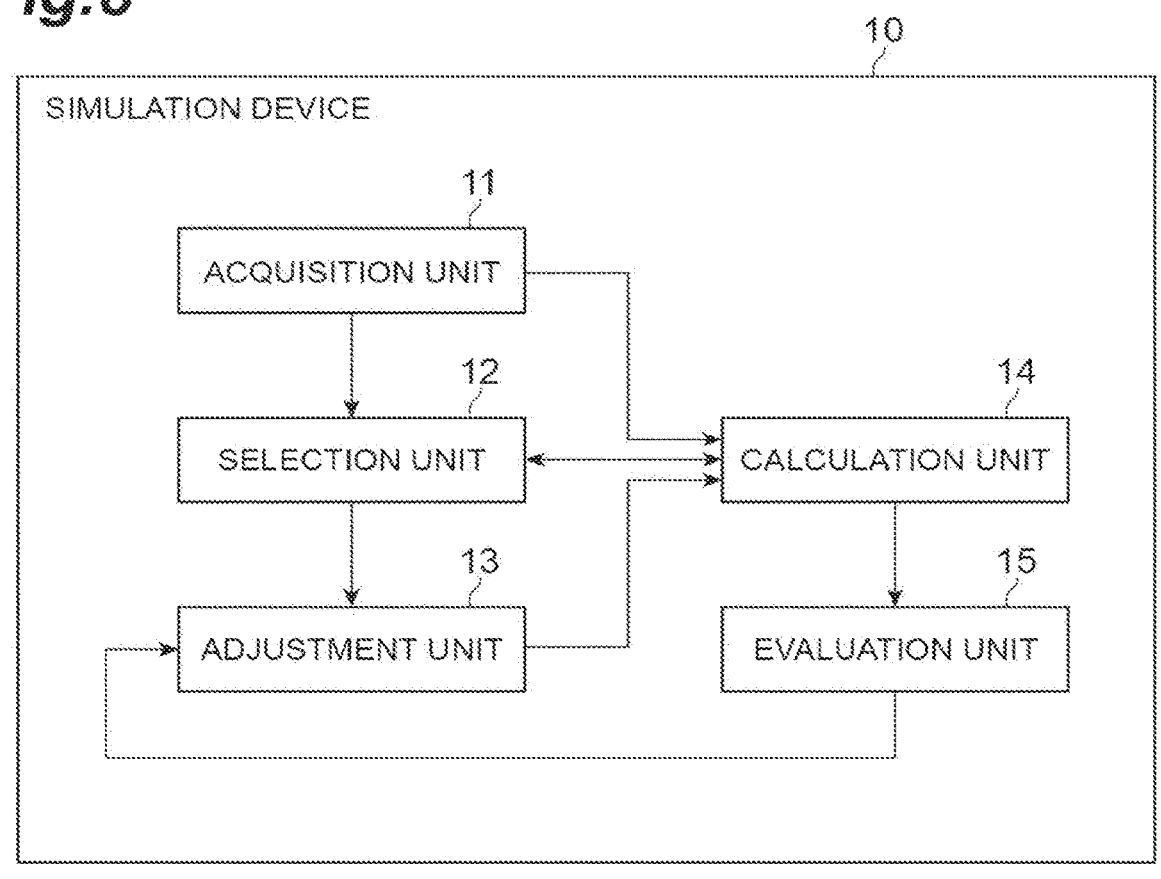
FIG. 8 is a block diagram showing a functional configuration of the simulation device shown in FIG. 1.

Next, the functional configuration of the simulation device 10 will be described with reference to FIG. 8. FIG. 8 is a block diagram showing a functional configuration of the simulation device shown in FIG. 1. As shown in FIG. 8, the simulation device 10 functionally includes an acquisition unit 11, a selection unit 12, an adjustment unit 13, a calculation unit 14, and an evaluation unit 15. Since the function (operation) of each functional unit will be described in detail in the description of the simulation method described later, the function of each functional unit will be briefly described here.

The acquisition unit 11 is a functional unit that acquires various information. The acquisition unit 11 acquires port information, vehicle information, vehicle carrier trailer information, rented vehicles number information, movement information, battery usage information, and usage time information from the management device 20.

The selection unit 12 is a functional unit that selects a target area. The target area is a simulation target divided area among a plurality of divided areas generated by dividing the relocation area.

The calculation unit 14 is a functional unit that virtually treats all the ports included in the non-target area as one virtual port and simulates movements of vehicles between a plurality of target ports and one virtual port. The non-target area is a divided area other than the target area among the plurality of divided areas. The target port is a port included in the target area. Simulated vehicle movement includes vehicle movement by a user and vehicle relocation by a vehicle carrier trailer.

The calculation unit 14 simulates a relocation of a vehicle between a plurality of target ports by performing a relocation recommendation process (recommendation algorithm). The relocation recommendation process is a process for recommending the relocation of the vehicle. Specifically, the calculation unit 14 determines the relocation port and the number of vehicles to be relocated by the relocation recommendation process. The relocation port is a port in which a vehicle is to be relocated and includes a collection port and an allocation port. For example, the calculation unit 14 calculates the work time in the relocation port and simulates the relocation based on the work time.

The adjustment unit 13 is a function unit that adjusts weights for a plurality of parameters used in the relocation recommendation process. The weight is, for example, a value from 0 to 1. The adjustment unit 13 selects a weight pattern from among a plurality of predetermined weight patterns. The weight pattern is a combination of weights for parameters.

The evaluation unit 15 is a functional unit that evaluates the weight. The evaluation unit 15 generates an evaluation result for the weight pattern.

Figure 9:
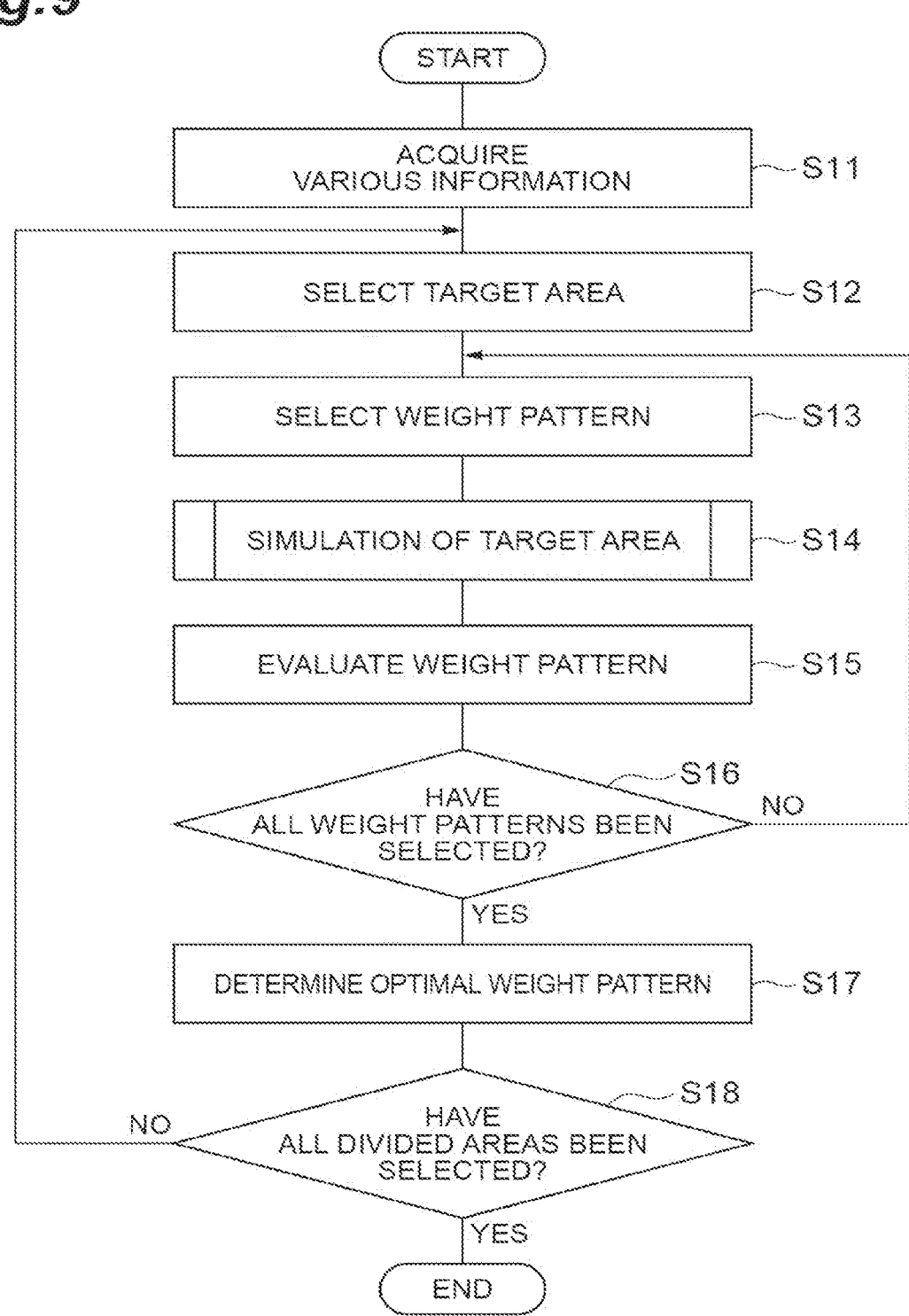
FIG. 9 is a flowchart showing a series of processes of a simulation method performed by the simulation device shown in FIG. 1.
Figure 10:
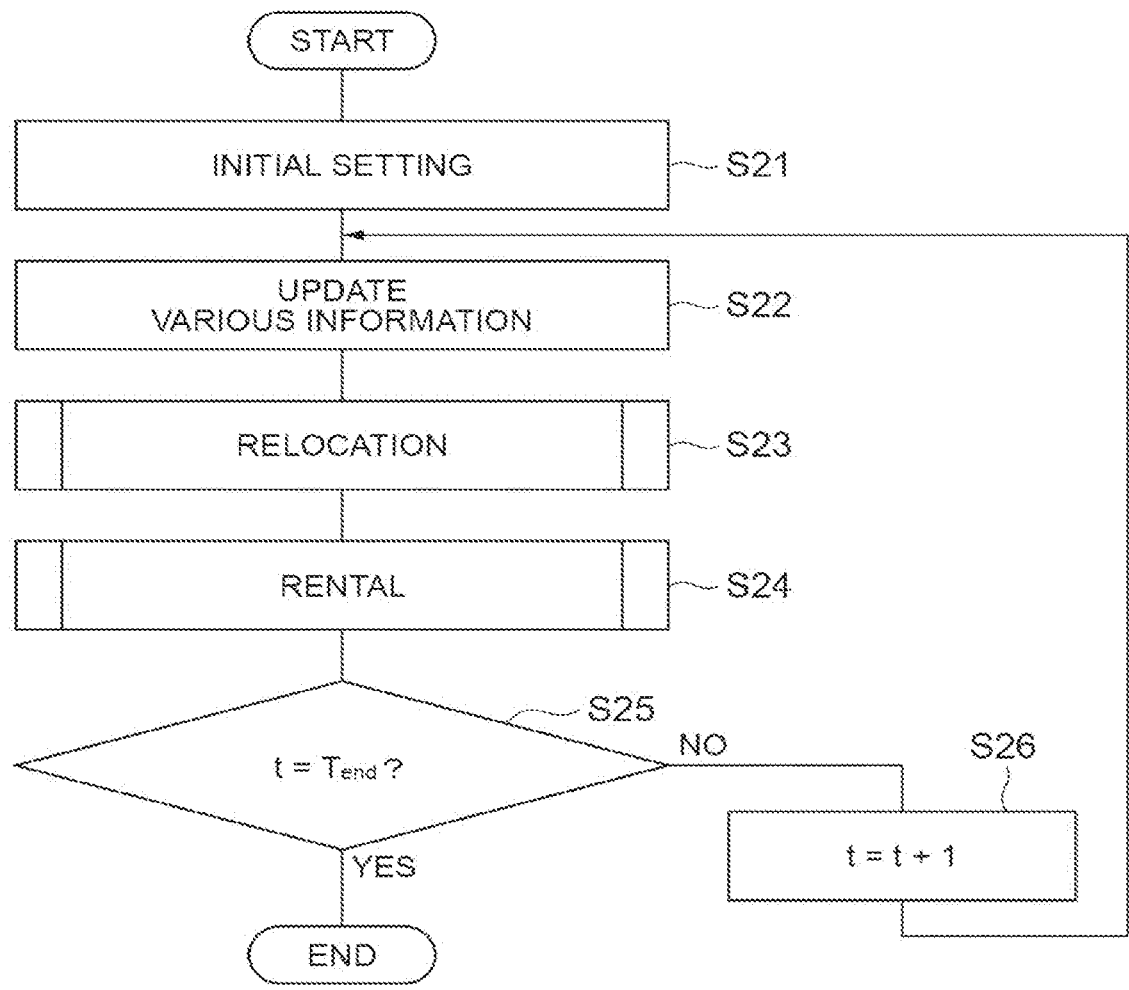
FIG. 10 is a flowchart showing the simulation process of the target area in detail.
Figure 11:
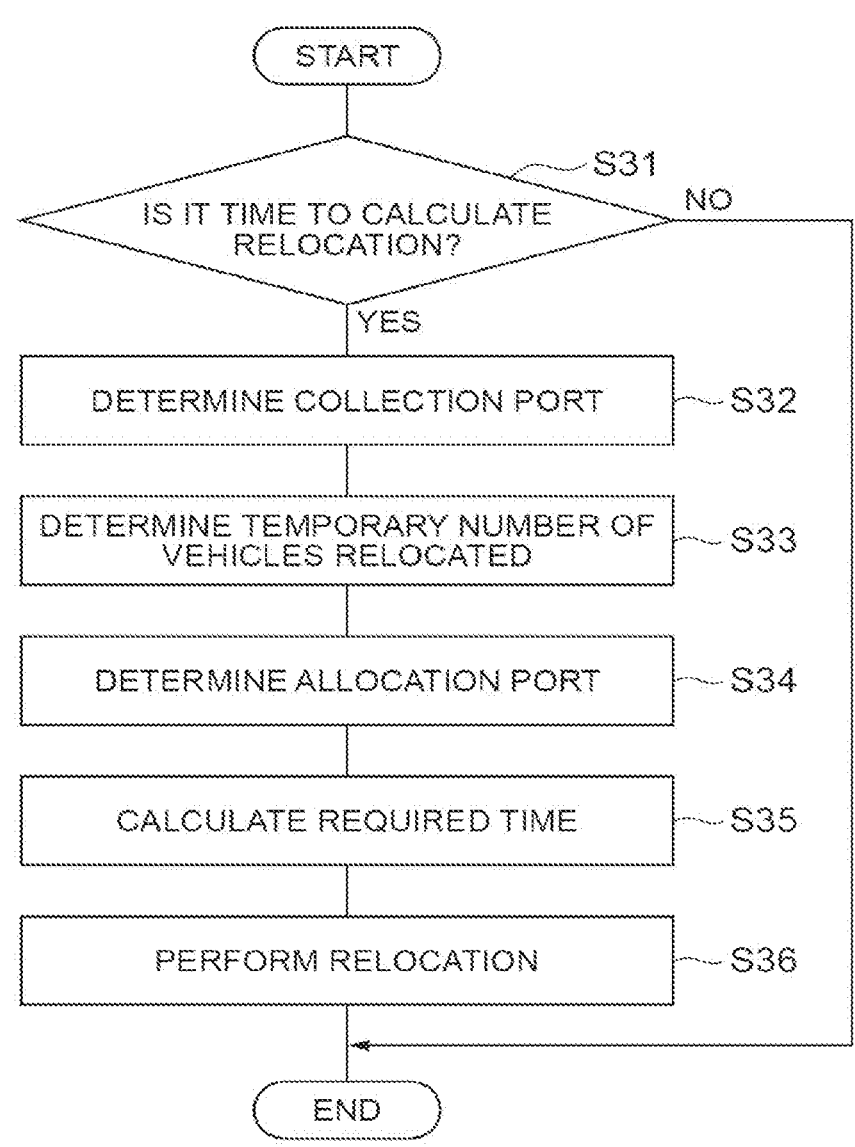
FIG. 11 is a flowchart showing the relocation process in detail.
Figure 12:
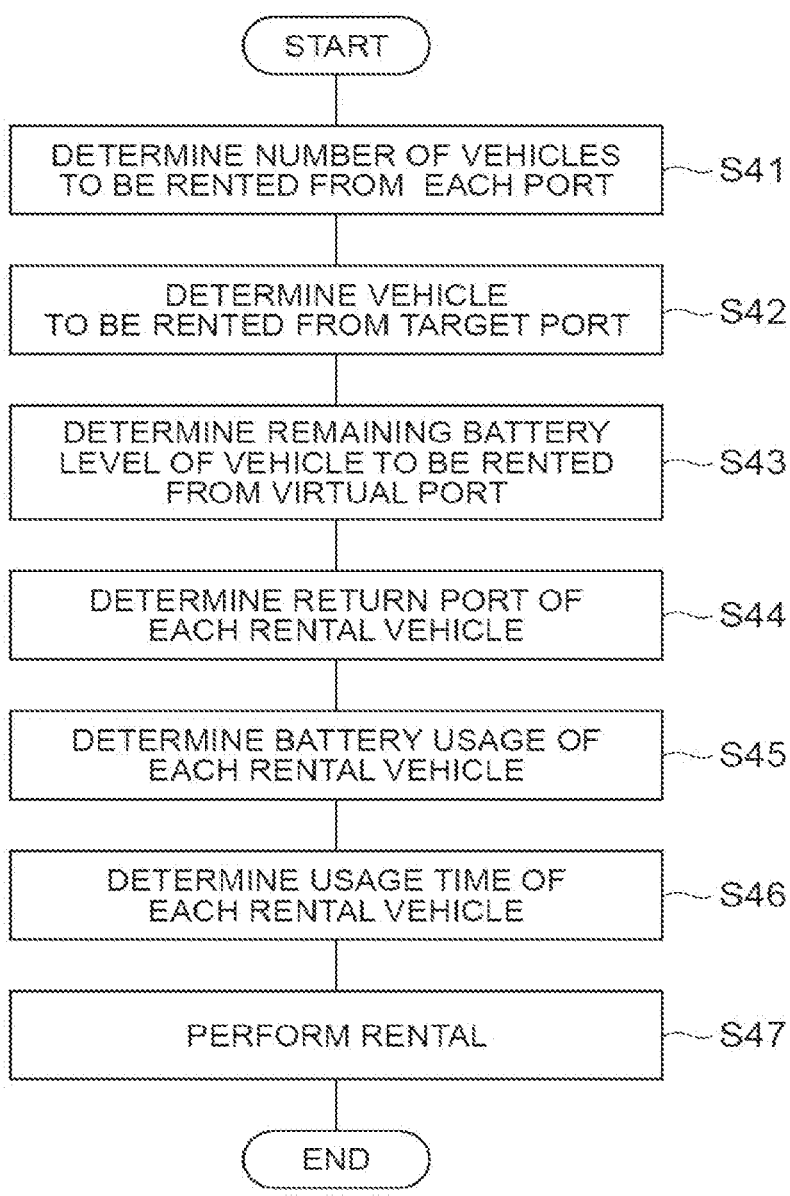
FIG. 12 is a flowchart showing the rental process in detail.
Figure 13:
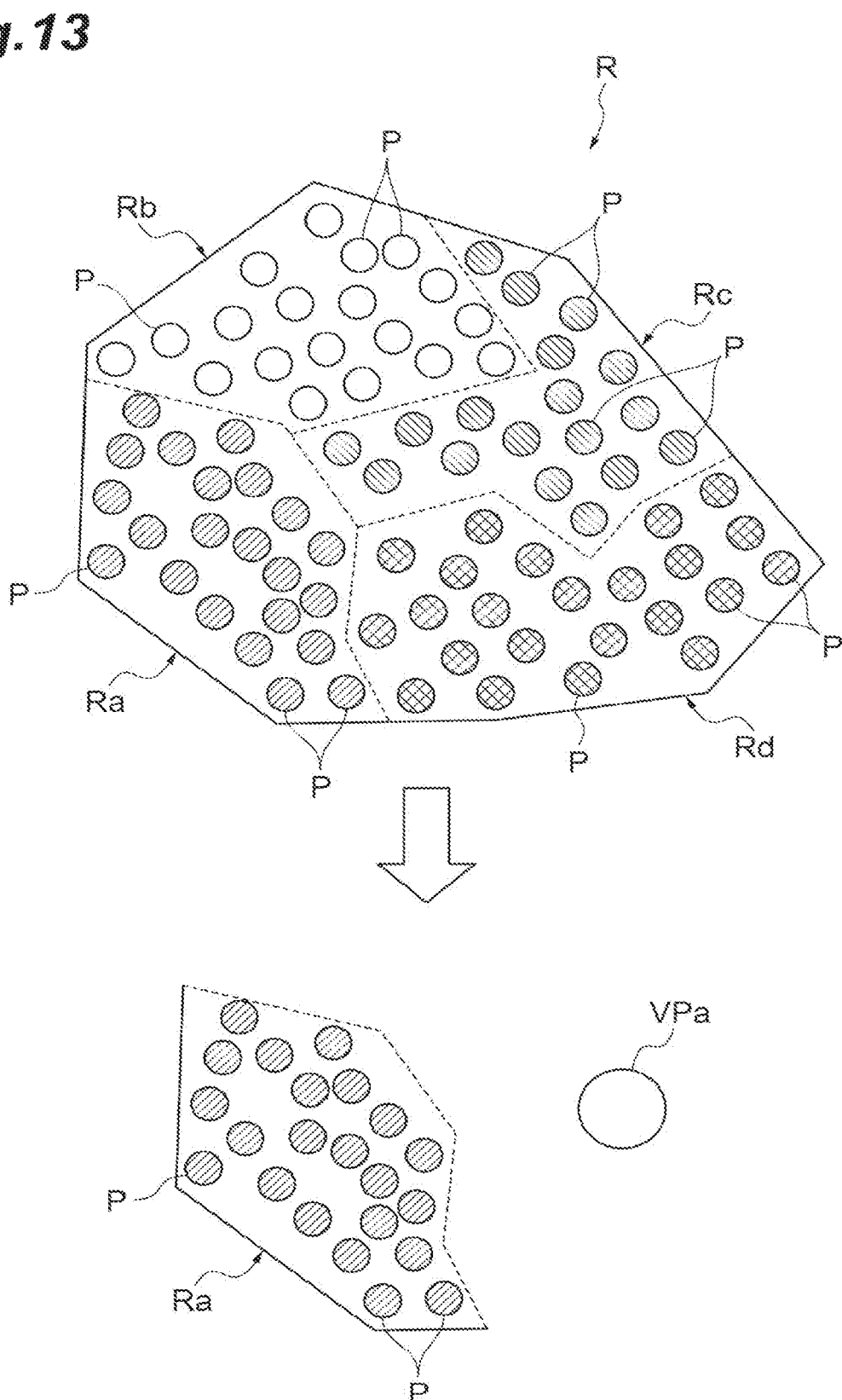
FIG. 13 is a diagram for explaining a process of selecting a target area.

Next, a simulation method performed by the simulation device will be described with reference to FIGS. 9 to 18. FIG. 9 is a flowchart showing a series of processes of a simulation method performed by the simulation device shown in FIG. 1. FIG. 10 is a flowchart showing the simulation process of the target area in detail. FIG. 11 is a flowchart showing the relocation process in detail. FIG. 12 is a flowchart showing the rental process in detail. FIG. 13 is a diagram for explaining a process of selecting a target area. FIG. 14 is a diagram showing an example of rented vehicles number information used in the simulation of the target area. FIG. 15 is a diagram showing an example of movement information used in the simulation of the target area. FIG. 16 is a diagram showing an example of battery usage information used in the simulation of the target area. FIG. 17 is a diagram showing an example of usage time information used in the simulation of the target area. FIG. 18 is a diagram showing an example of a list of vehicles available. The series of processes shown in FIG. 9 is started, for example, by a user of the simulation device 10 transmitting an optimization instruction to the simulation device 10. The optimization instruction is an instruction for optimizing the weight of each of a plurality of parameters used in the relocation recommendation process.

As shown in FIG. 9, first, the acquisition unit 11 acquires various information (step S11). In step S11, the acquisition unit 11 acquires port information, vehicle information, vehicle carrier trailer information, rented vehicles number information, movement information, battery usage information, and usage time information at a certain clock time from the management device 20. An arbitrary clock time is used as the clock time. Then, the acquisition unit 11 outputs the acquired various information to the calculation unit 14 and causes the selection unit 12 to select a target area.

Subsequently, the selection unit 12 selects a target area (step S12). In step S12, the selection unit 12 selects an unselected divided area as a target area from among a plurality of divided areas generated by dividing the relocation area. In the example shown in FIG. 13, the divided area Ra is selected as a target area. Then, the selection unit 12 outputs area information indicating the target area to the calculation unit 14 and causes the adjustment unit 13 to select a weight pattern.

Subsequently, the adjustment unit 13 selects a weight pattern (step S13). The adjustment unit 13 selects an unselected weight pattern from among a plurality of predetermined weight patterns. Then, the adjustment unit 13 outputs the selected weight pattern to the calculation unit 14.

Subsequently, the calculation unit 14 executes a simulation process of the target area (step S14). In the simulation process of the target area in step S14, as shown in FIG. 10, first, upon receiving the port information, the vehicle information, the vehicle carrier trailer information, the rented vehicles number information, the movement information, the battery usage information, and the usage time information from the acquisition unit 11, and receiving the area information from the selection unit 12, the calculation unit 14 performs initial setting (step S21).

In the simulation of the target area, the calculation unit 14 virtually treats all ports included in the non-target area as one virtual port. Therefore, as the initial setting, the calculation unit 14 converts each of the rented vehicles number information, the movement information, the battery usage information, and the usage time information received from the acquisition unit 11 into information for simulation of the target area.

The conversion processing of the rented vehicles number information will be described below. The calculation unit 14 extracts records including the port ID of the target port from the rented vehicles number information received from the acquisition unit 11. Then, the calculation unit 14 generates records of the virtual port from the remaining records (the records including the port IDs of the non-target ports) included in the rented vehicles number information. For example, the calculation unit 14 generates a record of the virtual port by setting an average value of the average numbers of rented vehicles included in the records of the same day type and the same clock time among the remaining records to the average number of rented vehicles at the day type and clock time of the virtual port. Then, as shown in FIG. 14, the calculation unit 14 generates the rented vehicles number information including the records of the target port and the records of the virtual port as rented vehicles number information for simulation of the target area.

The conversion processing of the movement information will be described below. The calculation unit 14 extracts records in which both the rental port and the return port are target ports from the movement information received from the acquisition unit 11. The calculation unit 14 calculates an average value of the numbers of times of movement included in records having the same rental port, the same day type, and the same clock time by using records in which the rental port is a target port and the return port is a port in a non-target area. The calculation unit 14 sets the calculated average value as the number of times of movement from the rental port to the virtual port at the day type and the clock time. By this processing, a record is generated in which the rental port is a target port and the return port is the virtual port.

Similarly, the calculation unit 14 calculates an average value of the numbers of times of movement included in records having the same return port, the same day type, and the same clock time by using records in which the rental port is a port in the non-target area and the return port is a target port. The calculation unit 14 sets the calculated average value as the number of times of movement from the virtual port to the return port at the day type and the clock time. By this processing, a record is generated in which the rental port is the virtual port and the return port is a target port. Further, the calculation unit 14 calculates an average value of the numbers of times of movement included in records having the same day type and the same clock time by using records in which both the rental port and the return port are ports in the non-target area. The calculation unit 14 sets the calculated average value as the number of times of movement from the virtual port to the virtual port at the day type and the clock time. By this processing, a record is generated in which both the rental port and the return port are the virtual ports.

Then, as shown in FIG. 15, the calculation unit 14 generates movement information including records in which both the rental port and the return port are target ports, records in which the rental port is a target port and the return port is the virtual port, records in which the rental port is the virtual port and the return port is a target port, and records in which both the rental port and the return port are the virtual ports, as movement information for simulation of the target area.

The conversion processing of the battery usage information and the conversion processing of the usage time information are similar to the conversion processing of the movement information. By the conversion processing, battery usage information for simulation of the target area shown in FIG. 16 and usage time information for simulation of the target area shown in FIG. 17 are generated.

Further, as the initial setting, the calculation unit 14 extracts a record of a port (target port) included in the target area indicated by the area information from the port information received from the acquisition unit 11. Then, the calculation unit 14 sets clock time t to 0 (initial value).

Subsequently, the calculation unit 14 updates various information (step S22). In step S22, the calculation unit 14 changes the vehicle state included in the vehicle information of each vehicle to be returned at clock time t from "moving" to "parked", and sets the port ID of the port to which the vehicle is returned as the port ID. Then, the calculation unit 14 increases the number of vehicles available included in the port information of the port to which the vehicle is returned by the number of vehicles returned to the port.

Further, the calculation unit 14 changes the vehicle state included in the vehicle information of the vehicle to be collected by the collection work started at clock time t from "parked" to "relocated", and changes the port ID from the port ID of the collection port to an invalid value. Then, the calculation unit 14 decreases the number of vehicles available included in the port information of the collection port by the number of vehicles to be collected from the port at clock time t (the number of vehicles relocated). Similarly, the calculation unit 14 changes the vehicle state included in the vehicle information of the vehicle allocated by the allocation work ending at clock time t from "relocated" to "parked", and sets the port ID of the allocation port as the port ID. Then, the calculation unit 14 increases the number of vehicles available included in the port information of the allocation port by the number of vehicles allocated in the port at clock time t (the number of vehicles relocated).

Subsequently, the calculation unit 14 executes the relocation process (step S23). In the relocation process in step S23, as shown in FIG. 11, first, the calculation unit 14 determines whether or not it is the timing to calculate the relocation (step S31). The relocation calculation is performed, for example, at a timing when the vehicle carrier trailer (worker) has completed the relocation work. When it is determined that it is not the timing to calculate the relocation (step S31; NO), the calculation unit 14 ends the relocation process. On the other hand, when it is determined in step S31 that it is the timing to calculate the relocation (step S31; YES), the calculation unit 14 specifies a vehicle carrier trailer that performs the relocation. For example, the calculation unit 14 specifies the vehicle carrier trailer which has completed the relocation work as the vehicle carrier trailer that performs the relocation. Then, the calculation unit 14 determines a collection port (step S32).

In step S32, the calculation unit 14 determines a collection port using parameters $X_{i,j}$ for determining a collection port. The variable i represents an index number of the port. The target port is assigned an integer value in order from 1 as the index number. The total number of target ports is Np. Therefore, the variable i can take an integer value from 1 to Np. The variable j is an index number of a parameter for determining a collection port. The parameter for determining the collection port is assigned an integer value in order from 1 as the index number. In the present embodiment, an integral value $X_{i,1}$, a priority $X_{i,2}$, a normalized value $X_{i,3}$, an access degree $X_{i,4}$, an increase rate $X_{i,5}$, the number of vehicles $X_{i,6}$, and the number of vehicles $X_{i,7}$ are used as the parameters $X_{i,j}$.

The integral value $X_{i,1}$ is a total value of the number of surplus vehicles occurring in the i-th port by a future clock time Ta. The number of surplus vehicles is the number of vehicles (surplus vehicles) exceeding the number of vehicles that can be parked in the port, and is also called the number of overflow vehicles. In this example, as shown in Equation (1), the integral value $X_{i,1}$ is a total value of the number of surplus vehicles occurring between x hours before the clock time Ta and the clock time Ta. As shown in Equation (2), the number of surplus vehicles is calculated based on the vehicles available number $c_{t,i}$, the demand number $d_{t,i}$, and the rack number $R_i$.

[Equation 1]

$$X_{i,1} = \sum_{t=Ta-x}^{Ta} f_x(c_{t,i}, d_{t,i}, R_i) \tag{1}$$

-continued

[Equation 2]

$$f_x(c_{t,i}, d_{t,i}, R_i) = \begin{cases} c_{t,i} - d_{t,i} - \alpha \times R_i & \text{if } c_{t,i} - d_{t,i} > \alpha \times R_i \\ 0 & \text{else} \end{cases} \tag{2}$$

The vehicles available number c u represents the number of vehicles that are predicted to be available in the i-th port at clock time t. The demand number $d_{t,i}$ represents the number of vehicles that are demanded in the i-th port at clock time t. The demand number $d_{t,i}$ is a difference between the number of vehicles predicted to be rented from the i-th port at clock time t (the number of vehicles to be rented) and the number of vehicles predicted to be returned to the i-th port at clock time t (the number of vehicles to be returned). When the number of vehicles to be rented is larger than the number of vehicles to be returned, the demand number $d_{t,i}$ is a positive value, and when the number of vehicles to be rented is smaller than the number of vehicles to be returned, the demand number $d_{t,i}$ is a negative value. It should be noted that the vehicles available number $c_{t,i}$ and the demand number $d_{t,i}$ are obtained by performing a calculation similar to the rental process described later.

The rack number $R_i$ represents the number of racks in the i-th port. The permissible rate $\alpha$ is a value representing the degree to which parking is permissible for the rack number $R_i$. For example, when the permissible rate $\alpha$ is 2, it is determined that overflow (surplus vehicle) has occurred if the remaining number of vehicles obtained by subtracting the demand number $d_{t,i}$ from the vehicles available number $c_{t,i}$ exceeds twice the rack number $R_i$. The rack number $R_i$ and the permissible rate $\alpha$ are predetermined. For example, the number of vehicles that can be parked, which is the result of multiplying the rack number $R_i$ by the permissible rate $\alpha$, may be obtained from the port information. The port information may include the rack number $R_i$ and the permissible rate $\alpha$.

The priority $X_{i,2}$ is a value indicating the degree to which the vehicle is preferentially collected. The larger the value of the priority $X_{i,2}$, the higher the priority. The priority $X_{i,2}$ is set in four stages, for example, high, medium, low, and no. The priority $X_{i,2}$ is preset for each port. As shown in Equation (3), the normalized value $X_{i,3}$ is a value obtained by normalizing the integral value $X_{i,1}$ by the rack number $R_i$.

[Equation 3]

$$X_{i,3} = \frac{X_{i,1} - R_i}{R_i} \tag{3}$$

The access degree $X_{i,4}$ is a value indicating the ease with which a vehicle carrier trailer can access the i-th port. The larger the access degree $X_{i,4}$ is, the easier it is for the vehicle carrier trailer to access the i-th port. The access degree $X_{i,4}$ becomes smaller as the distance from the position of the vehicle carrier trailer to the i-th port at clock time t becomes larger. The access degree $X_{i,4}$ is, for example, a value obtained by multiplying the distance from the position of the vehicle carrier trailer to the i-th port at clock time t by −1. The increase rate $X_{i,5}$ is a rate at which the number of vehicles increases in the i-th port between clock time t and the future clock time Ta. The increase rate $X_{i,5}$ is calculated by, for example, Equation (4).

[Equation 4]

$$X_{i,5} = \frac{\max\left(\left(c_{T_{a,i}} - d_{T_{a,i}}\right) - \left(c_{t,i} - d_{t,i}\right),\, o\right)}{R_i} \quad (4)$$

The number of vehicles $X_{i,6}$ is the number of vehicles having no remaining battery level in the i-th port at clock time t. For example, when the remaining battery level is equal to or less than a preset first threshold value, it is determined that there is no remaining battery level. The number of vehicles $X_{i,7}$ is the number of vehicles having a low remaining battery level in the i-th port at clock time t. For example, when the remaining battery level is equal to or less than a preset second threshold value and larger than the first threshold value, it is determined that the remaining battery level is low.

The calculation unit 14 extracts weights for the parameters from the weight pattern selected by the adjustment unit 13. Then, as shown in Equation (5), the calculation unit 14 calculates the weighted sum of the parameters for each port and sets the calculation result as the collection priority $X_i$ of the i-th port. Then, the calculation unit 14 determines the port having the largest collection priority $X_i$ as the collection port.

[Equation 5]

$$X_i = \sum\nolimits_{j=1}^{7} X_{i,j} \times w_j \quad (5)$$

Subsequently, the calculation unit 14 determines the temporary number of vehicles relocated (step S33). In step S33, the calculation unit 14 first calculates the recommended number of vehicles collected from the collection port determined in step S32. For example, the calculation unit 14 calculates the recommended number of vehicles collected based on the number of surplus vehicles at the clock time Ta. For example, the number of surplus vehicles at the clock time Ta is calculated as the recommended number of vehicles collected. Further, the calculation unit 14 extracts the carriable number of vehicles of the vehicle carrier trailer that performs the relocation from the vehicle carrier trailer information. Then, the calculation unit 14 determines the smaller one of the recommended number of vehicles collected and the carriable number of vehicles as the temporary number of vehicles relocated.

Subsequently, the calculation unit 14 determines an allocation port (step S34). In step S34, the calculation unit 14 determines an allocation port using parameters $Y_{i,k}$ for determining an allocation port. The variable k is an index number of a parameter for determining an allocation port. The parameter for determining the allocation port is assigned an integer value in order from 1 as the index number. In the present embodiment, an integral value $Y_{i,1}$ a priority $Y_{i,2}$, a normalized value $Y_{i,3}$ an access degree $Y_{i,4}$ a reduction rate $Y_{i,5}$ the number of vehicles $Y_{i,6}$ the number of vehicles $Y_{i,7}$, the number of vehicles allocatable $Y_{i,8}$ and an opportunity loss $Y_{i,9}$ are used as the parameters $Y_{i,k}$.

The integral value $Y_{i,1}$ is a total value of the number of insufficient vehicles occurring in the i-th port by the future clock time Ta. The number of insufficient vehicles is the number of vehicles (insufficient vehicles) that could not be used despite the demand for rental. In this example, as shown in Equation (6), the integral value $Y_{i,1}$ is a total value of the number of insufficient vehicles occurring between y hours before the clock time Ta and the clock time Ta. As shown in Equation (7), the number of insufficient vehicles is calculated on the basis of the vehicles available number cui and the demand number dii.

[Equation 6]

$$Y_{i,1} = \sum\nolimits_{t=Ta-y}^{Ta} f_y(c_{t,i}, d_{t,i}) \quad (6)$$

[Equation 7]

$$f_y(c_{t,i}) = \begin{Bmatrix} \beta - (c_{t,i} - d_{t,i}) & \text{if } c_{t,i} - d_{t,i} < \beta \\ o & \text{else} \end{Bmatrix} \quad (7)$$

The minimum number $\beta$ is a value representing a minimum number of vehicles that are desired to be parked in a port so that a shortage of vehicles does not occur. In this example, when the remaining number of vehicles obtained by subtracting the demand number $d_{t,i}$ from the vehicles available number $c_{t,i}$ falls below the minimum number $\beta$, it is determined that a shortage of vehicles has occurred. Since the demand number $d_{t,i}$ may be larger than the vehicles available number $c_{t,i}$, the remaining number of vehicles may have a negative value. For example, if the minimum number $\beta$ is 3 and the remaining number of vehicles is less than 3, it is determined that a shortage has occurred. The minimum number $\beta$ is predetermined. The port information may include the minimum number $\beta$.

The priority $Y_{i,2}$ is a value indicating the degree to which the vehicle is preferentially allocated. The larger the value of the priority $Y_{i,2}$, the higher the priority. The priority $Y_{i,2}$ is set in four stages, for example, high, medium, low, and no. The priority $Y_{i,2}$ is preset for each port. The normalized value $Y_{i,3}$ is a value obtained by normalizing the integral value $Y_{i,1}$ by the rack number $R_i$ as shown in Equation (8).

[Equation 8]

$$Y_{i,3} = \frac{Y_{i,1} - R_i}{R_i} \quad (8)$$

The access degree $Y_{i,4}$ is a value indicating the ease with which a vehicle carrier trailer can access the i-th port from the collection port. The larger the access degree $Y_{i,4}$ is, the easier it is for the vehicle carrier trailer to access the i-th port from the collection port. The access degree $Y_{i,4}$ becomes smaller as the distance from the collection port to the i-th port becomes larger. The access degree $Y_{i,4}$ is, for example, a value obtained by multiplying the distance from the collection port to the i-th port by −1. The reduction rate $Y_{i,5}$ is a rate at which the number of vehicles decreases in the i-th port between clock time t and the future clock time Ta. The reduction rate $Y_{i,5}$ is calculated by, for example, Equation (9).

[Equation 9]

$$Y_{i,5} = \frac{\max\left(\left(c_{t,i} - d_{t,i}\right) - \left(c_{Ta,i} - d_{Ta,i}\right),\, 0\right)}{R_i} \quad (9)$$

The number of vehicles $Y_{i,6}$ is the number of vehicles having no remaining battery level in the i-th port at clock time t. The number of vehicles $Y_{i,6}$ is determined in the same manner as the number of vehicles $X_{i,6}$. The number of vehicles $Y_{i,7}$ is the number of vehicles having a low remaining battery level in the i-th port at clock time t. The number of vehicles $Y_{i,7}$ is determined in the same manner as the number of vehicles $X_{i,7}$. The number of vehicles allocatable $Y_{i,8}$ is the number of vehicles that can be allocated in the i-th port at clock time t. The opportunity loss $Y_{i,9}$ is a value indicating a possibility of losing an opportunity for a vehicle to be rented. The larger the value of the opportunity loss $Y_{i,9}$ the higher the probability of losing an opportunity for a vehicle to be rented. The opportunity loss $Y_{i,9}$ is, for example, a sum of the integral value $Y_{i,1}$ the priority $Y_{i,2}$, the normalized value $Y_{i,3}$, the reduction rate $Y_{i,5}$, the number of vehicles $Y_{i,6}$ and the number of vehicles $Y_{i,7}$.

The calculation unit 14 extracts weights for the parameters from the weight pattern selected by the adjustment unit 13. Then, as shown in Equation (10), the calculation unit 14 calculates the weighted sum of the parameters for each port, and sets the calculation result as the allocation priority $Y_i$ of the i-th port.

[Equation 10]

$$Y_i = \sum\nolimits_{k=1}^{9} Y_{i,k} \times w_k \tag{10}$$

Then, the calculation unit 14 determines the port having the largest allocation priority $Y_i$ as the allocation port. At this time, the calculation unit 14 calculates the recommended number of vehicles allocated to the allocation port. For example, the calculation unit 14 calculates the recommended number of vehicles allocated based on the number of insufficient vehicles at the clock time Ta. For example, the number of insufficient vehicles at the clock time Ta is calculated as the recommended number of vehicles allocated. Then, the calculation unit 14 compares the temporary number of vehicles relocated with the recommended number of vehicles allocated, and determines the temporary number of vehicles relocated as the number of vehicles relocated when the recommended number of vehicles allocated is equal to or greater than the temporary number of vehicles relocated.

On the other hand, when the recommended number of vehicles allocated is less than the temporary number of vehicles relocated, the calculation unit 14 again calculates the allocation priority $Y_i$ for each port other than the allocation port (first allocation port). This calculation method of the allocation priority $Y_i$ is the same as the above-described calculation method of the allocation priority $Y_i$ except that a value indicating the ease with which the vehicle carrier trailer can access the i-th port from the first allocation port is used as the access degree $Y_{i,4}$. The access degree $Y_{i,4}$ becomes smaller as the distance from the first allocation port to the i-th port becomes larger. The access degree $Y_{i,4}$ is, for example, a value obtained by multiplying the distance from the first allocation port to the i-th port by −1. Then, the calculation unit 14 determines the port having the largest allocation priority $Y_i$ as a second allocation port. At this time, the calculation unit 14 calculates the recommended number of vehicles allocated to the second allocation port in the same manner as the first allocation port.

Then, the calculation unit 14 compares the sum of the recommended number of vehicles allocated to the first allocation port and the recommended number of vehicles allocated to the second allocation port with the temporary number of vehicles relocated. When the sum is equal to or greater than the temporary number of vehicles relocated, the calculation unit 14 determines the temporary number of vehicles relocated as the number of vehicles relocated. In this case, the recommended number of vehicles allocated to the first allocation port is allocated to the first allocation port, and the number of vehicles obtained by subtracting the recommended number of vehicles allocated to the first allocation port from the number of vehicles relocated is allocated to the second allocation port.

On the other hand, when the sum of the recommended number of vehicles allocated to the first allocation port and the recommended number of vehicles allocated to the second allocation port is less than the temporary number of vehicles relocated, the calculation unit 14 determines the sum as the number of vehicles relocated. In this case, the recommended number of vehicles allocated to the first allocation port is allocated to the first allocation port, and the recommended number of vehicles allocated to the second allocation port is allocated to the second allocation port.

Subsequently, the calculation unit 14 calculates the time required for the relocation (step S35). When one port is determined as the allocation port in step S34, the required time includes a travel time from the current position of the vehicle carrier trailer to the collection port, a work time in the collection port (collection time), a travel time from the collection port to the allocation port, and a work time in the allocation port (allocation time). When two ports are determined as the allocation ports, the required time includes a travel time from the current position of the vehicle carrier trailer to the collection port, a work time in the collection port (collection time), a travel time from the collection port to the first allocation port, a work time in the first allocation port (allocation time), a travel time from the first allocation port to the second allocation port, and a work time in the second allocation port (allocation time). The calculation unit 14 calculates a travel time between two ports by a known method. For example, the calculation unit 14 calculates the travel time between two ports by dividing the distance between the two ports by the assumed speed of the vehicle carrier trailer.

A method for calculating the work time in the relocation port (collection port and allocation port) will be described. Since the work time in each relocation port is obtained by a similar calculation method, a calculation method of the work time in the i-th port as the relocation port is exemplified. As shown in Equation (11), the work time $Tp_i$ in the port includes a basic work time $Tb_i$, a carrying time $Tc_j$, and a maintenance time $Tm_i$.

[Equation 11]

$$Tp_i = Tb_i + Tc_i + Tm_i \tag{11}$$

The basic work time $Tb_i$ is a time required for basic work in the i-th port. An example of basic work is stopping a vehicle carrier trailer. The basic work time $Tb_i$ is a fixed value and may vary from port to port. The basic work time $Tb_i$ is calculated and set in advance from the past work records (time actually required for basic work) in the i-th port.

The carrying time $Tc_i$ is a time required for a worker to carry vehicles (target vehicles) to be relocated between the i-th port and a vehicle carrier trailer stopped for carrying out work in the i-th port. As shown in Equation (12), the calculation unit 14 calculates the carrying time $Tc_i$ based on the number $Nr_i$ of target vehicles in the i-th port, the number Ns of vehicles that can be carried by a worker in one carrying work, and the time $f(M_i)$ required for one carrying work in the i-th port. Specifically, the calculation unit 14 calculates the carrying time $Tc_i$ by multiplying the division result obtained by dividing the number $Nr_i$ by the number $Ns$ by the time $f(M_i)$.

[Equation 12]

$$Tc_i = \frac{Nr_i}{N_s} \times f(M_i) \tag{12}$$

When one port is determined as an allocation port, the number $Nr_i$ in the collection port and the allocation port is the number of vehicles relocated determined in step S34. When two ports are determined as the allocation ports, the number $Nr_i$ in the collection port is the number of vehicles relocated determined in step S34, and the number $Nr_i$ in each allocation port is the number of vehicles allocated determined in step S34. The number $Ns$ is a value determined depending on the number of workers and the like, and is set in advance for each vehicle carrier trailer.

The time $f(M_i)$ is calculated based on map image data $M_i$. The map image data $M_i$ is image data showing a map around the i-th port (within a certain range including the i-th port). The map image data $M_i$ includes environmental information within a certain range including the i-th port. Examples of environmental information include the shape of a road, the position of a traffic signal, a road sign, the shape of a building, and the type of building. In other words, the calculation unit 14 calculates the carrying time $Tc_i$ based on the map image data $M_i$.

The function f defines the relationship between the time required for one carrying work and the map image data $M_i$. A machine learning model can be used as such a function f. For example, the machine learning model is learned by using a combination of an explanatory variable and a target variable for the plurality of ports, using map image data around the port (within a certain range including the port) as an explanatory variable, and using past work records (time required for one carrying work) in the port as a target variable. In such a machine learning model, the inputted map image data is vectorized to extract a feature.

The maintenance time $Tm_i$ is a time required for maintaining the i-th port. Examples of works for maintenance include a work for restocking leaflets and a cleaning work. The calculation unit 14 calculates the maintenance time $Tm_i$ based on an elapsed time $\Delta t_i$ which has elapsed since a worker for relocation visited the i-th port last time. Specifically, as shown in Equation (13), the calculation unit 14 calculates the maintenance time $Tm_i$ using the function g. The function g defines a relationship between the maintenance time $Tm_i$ and the elapsed time $\Delta t_i$. That is, the maintenance time $Tm_i$ is changed in accordance with the elapsed time $\Delta t_i$. As the elapsed time $\Delta t_i$ increases, the maintenance time $Tm_i$ increases. The function g is obtained in advance from past work records (actual maintenance time required for maintenance work) in the plurality of ports, and is stored. The function g is set common to all ports, for example.

[Equation 13]

$$Tm_i = g(\Delta t_i) \tag{13}$$

Subsequently, the calculation unit 14 performs the relocation (step S36). In step S36, the calculation unit 14 changes the vehicle carrier trailer state included in the vehicle carrier trailer information of the vehicle carrier trailer to "moving", sets the port ID of the collection port determined in step S32 as the collection port ID, sets the port ID of the allocation port determined in step S34 as the allocation port ID, and sets the number of vehicles to be relocated determined in step S34 as the number of vehicles to be relocated. Then, the calculation unit 14 stores that the collection work is started in the collection port at the first clock time obtained by adding the travel time from the current position of the vehicle carrier trailer to the collection port to clock time t, that the collection work in the collection port is completed at the second clock time obtained by adding the work time in the collection port to the first clock time, that the allocation work in the allocation port is started at the third clock time obtained by adding the travel time from the collection port to the allocation port to the second clock time, and that the allocation work in the allocation port is completed at the fourth clock time obtained by adding the work time in the allocation port to the third clock time. It should be noted that the same applies to the case where two ports are determined as the allocation ports. Thus, the calculation unit 14 ends the relocation process.

Subsequently, the calculation unit 14 performs a rental process (step S24). In the rental process in step S24, as shown in FIG. 12, the calculation unit 14 first determines the number of vehicles to be rented from each port (step S41). Specifically, for each of the target ports and the virtual port, the calculation unit 14 determines the number of vehicles (number of vehicles to be rented) to be rented from the port at clock time t. In the following description, a vehicle to be rented from a port may be referred to as a "vehicle rented from a port" or a "rental vehicle". For example, the calculation unit 14 determines the number of vehicles to be rented from each port according to the probability distribution of the number of rented vehicles by using the rented vehicles number information for simulation of the target area. Hereinafter, an example of a method for determining the number of vehicles to be rented will be described using the rented vehicles number information for simulation of the target area shown in FIG. 14.

For example, the number of vehicles to be rented from a port having a port ID of "Pa1" (hereinafter referred to as "port Pa1" or the like) at 7:00 on Monday is determined by generating a random number (integer value) in accordance with a Poisson distribution having a peak at "7" which is the average number of rented vehicles at 7:00 on a weekday in the port Pa1. That is, the generated random number is determined as the number of vehicles to be rented.

Subsequently, the calculation unit 14 determines a vehicle (rental vehicle) to be rented from each target port (step S42). In step S42, the calculation unit 14 generates a list of vehicles available (vehicle list) as shown in FIG. 18 by extracting a record of a vehicle parked in the target port from the vehicle information updated in step S22. Then, the calculation unit 14 selects, from the vehicle list, vehicles corresponding to the number of vehicles to be rented determined in step S41 as rental vehicles. For example, the calculation unit 14 determines a rental vehicle based on the remaining battery level of each vehicle parked in the target port. Specifically, the usage probability of each vehicle is calculated such that the probability that the vehicle is selected increases as the remaining battery level of the vehicle increases.

For example, the usage probability of a vehicle having a remaining battery level equal to or greater than the remaining level threshold value is expressed by Equation (14) using a number $n_a$, a number $n_b$, a constant $C_a$, and a constant $C_b$. It should be noted that the number $n_a$ is the number of vehicles having a remaining battery level equal to or greater than the remaining level threshold value among the vehicles available. The number no is the number of vehicles having a remaining battery level less than the remaining level threshold value among the vehicles available. The constant $C_a$ is used for determining a usage probability of a vehicle having a remaining battery level equal to or greater than the remaining level threshold value. The constant $C_b$ is used for determining a usage probability of a vehicle having a remaining battery level less than the remaining level threshold value. The constant $C_a$ is greater than the constant $C_b$. The constant $C_a$, the constant $C_b$, and the remaining level threshold value are set in advance based on past usage records and the like.

[Equation 14]

$$\frac{C_a}{C_a \times n_a \times C_b \times n_b} \tag{14}$$

Similarly, the usage probability of a vehicle having a remaining battery level less than the remaining level threshold value is expressed by Equation (15) using the number $n_a$, the number $n_b$, the constant $C_a$, and the constant $C_b$.

[Equation 15]

$$\frac{C_b}{C_a \times n_a + C_b \times n_b} \tag{15}$$

Then, the calculation unit 14 selects rental vehicles corresponding to the number of vehicles to be rented based on the usage probability of each vehicle available.

Subsequently, the calculation unit 14 determines the remaining battery level of the vehicle to be rented from the virtual port (step S43). Since the virtual port is a virtual representation of all ports included in the non-target area, an available vehicle list is not generated for the virtual port. Therefore, the rental vehicle is not selected in the virtual port, but the remaining battery levels of the vehicles corresponding to the number of vehicles to be rented are determined. That is, in the virtual port, it is assumed that a virtual vehicle having the determined remaining battery level is selected as a rental vehicle.

In step S43, the calculation unit 14 determines the remaining battery level of the rental vehicle in the virtual port based on, for example, the remaining battery level of the vehicle existing in the non-target area. Specifically, the calculation unit 14 extracts the vehicle information of the vehicle existing in the non-target area from the vehicle information updated in step S22. Then, the calculation unit 14 uses the extracted vehicle information to count the number of vehicles having the remaining battery level among all vehicles existing in the non-target area for each remaining battery level. Then, the calculation unit 14 calculates the usage probability of each remaining battery level by dividing the number of vehicles having each remaining battery level by the total number of vehicles existing in the non-target area. Then, the calculation unit 14 determines the remaining battery level of each rental vehicle in the virtual port based on the usage probability of each remaining battery level. The calculation unit 14 may calculate the remaining battery level of the rental vehicle in the virtual port based on the remaining battery levels of all vehicles existing in the relocation area.

Subsequently, the calculation unit 14 determines a return port (destination) to which the vehicle to be rented from each port is returned (step S44). The calculation unit 14 determines a return port of each rental vehicle according to a probability distribution of return ports by using movement information for simulation of the target area, for example. An example of a method for determining a return port will be described below using the movement information for simulation of the target area shown in FIG. 15.

In the example shown in FIG. 15, among vehicles rented from the port Pa1 at 8:00 on a weekday, four vehicles are returned to the port Pa1, one vehicle is returned to the port Pa3, three vehicles are returned to the port Pa4, and two vehicles are returned to the virtual port VPa. In this case, the probability that the port Pa1 is selected as the return port of the vehicle rented from the port Pa1 at 8:00 on Monday is 0.4 (=4/(4+1+3+2)). Similarly, the probability that the port Pa3 is selected as the return port is 0.1, the probability that the port Pa4 is selected is 0.3, and the probability that the virtual port VPa is selected is 0.2. The calculation unit 14 determines a return port based on the above-described probability. That is, the calculation unit 14 determines one of the return ports as a return port to which the rental vehicle is returned according to the distribution (polynomial distribution) of the probability that the vehicles are returned to each return port.

Subsequently, the calculation unit 14 determines the battery usage of the vehicle to be rented from each port (step S45). The calculation unit 14 determines the battery usage of the rental vehicle based on the rental port and the return port of each rental vehicle, for example. The calculation unit 14 determines the battery usage of each rental vehicle by using the battery usage information for simulation of the target area. An example of a method for determining a battery usage using the battery usage information for simulation of the target area shown in FIG. 16 will be described below. For example, if the rental port is the port Pa1 and the return port is the port Pa3, the battery usage is determined to be 0.3.

Subsequently, the calculation unit 14 determines the usage time of the vehicle to be rented from each port (step S46). The calculation unit 14 determines the usage time based on the rental port and the return port of each rental vehicle, for example. The calculation unit 14 determines the usage time of each rental vehicle according to the probability distribution of usage time by using the usage time information for simulation of the target area. An example of a method for determining the usage time will be described below using the usage time information for simulation of the target area shown in FIG. 17.

For example, when the rental port is the port Pa1 and the return port is the port Pa3, the usage time of the vehicle is determined by generating a random number (integer value) according to a Poisson distribution having a peak at "0.6" (hours). That is, the generated random number is determined as the usage time.

Subsequently, the calculation unit 14 performs a rental (step S47). In step S47, the calculation unit 14 changes the vehicle state included in the vehicle information of each vehicle to be rented at clock time t from the target port from "parked" to "moving", changes the port ID to an invalid value, and subtracts the calculated battery usage from the remaining battery level. Further, the calculation unit 14 newly generates a record of vehicle information for each vehicle to be rented from the virtual port. Specifically, calculation unit 14 assigns a new vehicle ID to each vehicle, sets "moving" as the vehicle state, sets an invalid value as the port ID, and sets a value obtained by subtracting the battery usage determined in step S45 from the remaining battery level determined in step S43 as the remaining battery level.

Further, the calculation unit 14 reduces the number of vehicles available included in the port information of the target port from which the vehicle is rented by the number of vehicles rented from the port. Then, the calculation unit 14 stores (stacks) that the vehicle is returned to the return port at a clock time obtained by adding the usage time of each vehicle to clock time t. Note that the port information of the ports included in the non-target area is not changed. Thus, the calculation unit 14 ends the rental process.

Subsequently, the calculation unit 14 determines whether or not clock time t has reached the end clock time $T_{end}$ (step S25). The end clock time $T_{end}$ is a clock time at which the simulation ends. The end clock time $T_{end}$ is set, for example, to a value indicating that 24 hours have elapsed since the clock time 0. When clock time t is different from the end clock time $T_{end}$, the calculation unit 14 determines that clock time t has not reached the end clock time $T_{end}$ (step S25; NO), and adds 1 to clock time t (step S26). Then, the calculation unit 14 performs the processes of steps S22 to S25 again for next clock time t. On the other hand, when clock time t is the same value as the end clock time $T_{end}$, the calculation unit 14 determines that clock time t has reached the end clock time $T_{end}$ (step S25; YES), and ends the simulation process of the target area.

Next, the evaluation unit 15 evaluates the weight pattern (step S15). In step S15, the evaluation unit 15 generates an evaluation result for the weight (weight pattern) based on the number of surplus vehicles and the number of insufficient vehicles occurring in each port when the relocation is performed using the weight pattern. For example, as shown in Equation (16), the evaluation unit 15 calculates the total sum of the surplus number $a_{i,t}$ and the insufficient number $b_{i,t}$ occurring in each port during a predetermined period as the evaluation result E. The number of ports Np is the total number of target ports. The predetermined period is a period from the clock time 0 to the end clock time $T_{end}$. The surplus number $a_{i,t}$ is the number of surplus vehicles occurring at clock time t in the i-th port. The insufficient number $b_{i,t}$ is the number of insufficient vehicles occurring at clock time t in the i-th port. Then, the evaluation unit 15 outputs the evaluation result to the adjustment unit 13.

[Equation 16]

$$E = \sum_{i=1}^{Np} \sum_{t=0}^{T_{end}} (a_{i,t} + b_{i,t}) \tag{16}$$

Subsequently, the adjustment unit 13 determines whether or not all the weight patterns have been selected (step S16). When it is determined that not all the weight patterns have been selected (step S16; NO), the adjustment unit 13 selects an unselected weight pattern (step S13). Then, steps S14 to S16 are performed again. When it is determined in step S16 that all the weight patterns have been selected (step S16; YES), the adjustment unit 13 determines an optimum weight pattern for the target area (step S17).

In step S17, the adjustment unit 13 determines an optimum weight pattern from all the weight patterns based on the evaluation result. In other words, the adjustment unit 13 determines an optimum weight for each of the plurality of parameters based on the evaluation result. For example, the adjustment unit 13 determines the weight pattern having the smallest evaluation result E among all the weight patterns as the optimum weight pattern for the target area.

Subsequently, the selection unit 12 determines whether or not all the divided areas have been selected as the target area (step S18). When it is determined that not all the divided areas have been selected as the target area (step S18; NO), the selection unit 12 selects an unselected divided area as the target area (step S12). Then, steps S13 to S18 are performed again. When it is determined in step S18 that all the divided areas have been selected as the target area (step S18; YES), the adjustment unit 13 outputs the optimum weight pattern for each target area to the calculation unit 14. Upon receiving the optimum weight pattern from the adjustment unit 13, the calculation unit 14 simulates the relocation by performing the relocation recommendation process in each target area using the optimum weight pattern.

Thus, the series of processes of the simulation method ends. Note that step S24 may be performed before step S23 or may be performed in parallel with step S23. Steps S42 to S44 may be performed in any order or may be performed in parallel with each other. Step S46 may be performed before step S45 or may be performed in parallel with step S45. Steps S45 and S46 only need to be performed after step S44.

All the divided areas need not to be selected as the target area. For example, the optimization instruction may include area information indicating a divided area to be optimized. In this case, in step S18, the selection unit 12 determines whether or not all the divided areas to be optimized have been selected.

In the simulation device 10 described above, the relocation of the vehicle is simulated based on the work time $Tp_i$ in the relocation port (collection port and allocation port). For example, the carrying time $Tc_i$ may vary depending on the surrounding environment of the relocation port. Specifically, when the relocation port is adjacent to a broad road, the vehicle carrier trailer can be stopped near the relocation port, so that it is considered that the work of carrying the vehicle between the vehicle carrier trailer and the relocation port (carrying work) does not take much time. On the other hand, when the relocation port is located at a place where the vehicle carrier trailer cannot enter, the position where the vehicle carrier trailer stops may be away from the relocation port. In such a case, the carrying work may take a long time. In addition, when there is a lot of traffic around the relocation port, the carrying work may take a long time. As in these examples, the work time $Tp_i$ may vary depending on the relocation port. Therefore, the simulation of the relocation of vehicles can be realized with high accuracy by considering the work time $Tp_i$ in the relocation port. As a result, the simulation accuracy of the movement of the vehicle can be improved.

The calculation unit 14 calculates the carrying time $Tc_i$ based on the map image data $M_i$ indicating a map around the relocation port. As described above, the carrying time $Tc_i$ may vary depending on the surrounding environment of the relocation port. Therefore, by using the map image data $M_i$, the surrounding environment of the relocation port can be considered. As a result, the calculation accuracy of the carrying time $Tc_i$ can be improved, and thus the calculation accuracy of the work time $Tp_i$ can be improved.

The calculation unit 14 uses a machine learning model learned using map image data around a port as an explanation variable and the time required for one carrying work at the port as a purpose variable to calculate a carrying time $Tc_i$. It is conceivable to calculate the carrying time $Tc_i$ using the actual value of the past carrying time in one relocation port. However, when the number of past actual values is small, the calculation accuracy of the carrying time $Tc_i$ may be reduced. On the other hand, carrying times in relocation ports with similar surrounding environments are considered to have similar trends. According to the above-described configuration, by using the machine learning model, the carrying time $Tc_i$ is calculated in consideration of the actual value of the past carrying time in the relocation port having a similar surrounding environment. Therefore, even when the number of past actual values of past carrying time in the relocation port is small, the calculation accuracy of the carrying time $Tc_i$ can be improved, and thus the calculation accuracy of the work time $Tp_i$ can be improved.

A worker may not be able to carry all vehicles in a single carrying work. Therefore, the calculation unit 14 calculates the carrying time $Tc_i$ based on the number $Nr_i$ of the target vehicles to be relocated in the relocation port, the number Ns that can be carried by the worker in one carrying work, and the time $f(M_i)$ required for one carrying work in the relocation port. For example, the carrying time $Tc_i$ is calculated by multiplying the division result obtained by dividing the number $Nr_i$ by the number Ns by the time $f(M_i)$. According to this configuration, even when the worker cannot carry all the target vehicles in one carrying work, the carrying time $Tc_i$ can be calculated.

When any worker has not visited the relocation port for a long time, it is considered that maintenance such as cleaning work takes much time. Generally, as the elapsed time $\Delta t_i$ increases, the maintenance time $Tm_i$ increases. In order to take this tendency into consideration, the calculation unit 14 calculates the maintenance time $Tm_i$ based on the elapsed time $\Delta t_i$ which has elapsed since a worker visited the relocation port last time. According to this configuration, the calculation accuracy of the maintenance time $Tm_i$ can be improved, and thus the calculation accuracy of the work time $Tp_i$ can be improved.

The calculation unit 14 calculates the maintenance time $Tm_i$ by using the function g defining the relationship between the maintenance time $Tm_i$ and the elapsed time $\Delta t_i$. The function g is obtained from the past maintenance time in a plurality of ports. It is conceivable to calculate the maintenance time $Tm_i$ using the actual value of the past maintenance time in one relocation port. However, when the number of past actual values is small, the calculation accuracy of the maintenance time $Tm_i$ may be reduced. On the other hand, the maintenance time is considered to have a similar tendency in all ports. According to the above-described configuration, by using the function g, the maintenance time $Tm_i$ is calculated in consideration of the actual values of the past maintenance time in not only the relocation port but also other ports. Therefore, even when the number of past actual values of the maintenance time in the relocation port is small, the calculation accuracy of the maintenance time $Tm_i$ can be improved, and thus the calculation accuracy of the work time $Tp_i$ can be improved.

The calculation unit 14 determines the collection port and the allocation port by using the relocation recommendation process (recommendation algorithm). According to this configuration, it is possible to determine an optimum collection port and an optimum allocation port for effectively performing the relocation.

The calculation unit 14 determines the number of vehicles to be relocated based on the number of surplus vehicles occurring in the collection port, the carriable number of vehicles of the vehicle carrier trailer that performs the relocation, and the number of insufficient vehicles occurring in the allocation port. For example, the number of vehicles to be relocated may be determined so as to reduce the number of surplus vehicles and the number of insufficient vehicles within the range of the carriable number of vehicles of the vehicle carrier trailer. According to this configuration, it is possible to effectively suppress excess or shortage of vehicles in each port by using the vehicle carrier trailer.

The adjustment unit 13 adjusts the weight for each of the plurality of parameters used in the relocation recommendation process. The calculation unit 14 simulates the relocation by performing the relocation recommendation process using the weight. According to this configuration, the relocation can be simulated while adjusting the degree of influence of each parameter.

For example, it is considered that the smaller the total of the number of surplus vehicles and the number of insufficient vehicles occurring in each port as a result of the relocation, the more effective the relocation. Therefore, the evaluation unit 15 generates an evaluation result for the weight of each parameter based on the number of surplus vehicles and the number of insufficient vehicles occurring in each port when the relocation is performed. According to this configuration, the weight of each parameter is evaluated according to the effect of the relocation. Therefore, the validity of the weight of the parameter can be judged from the evaluation result.

The evaluation unit 15 determines an optimum weight for each of the plurality of parameters based on the evaluation result. The calculation unit 14 simulates the relocation by performing the relocation recommendation process using the optimum weight. According to this configuration, it is possible to simulate the relocation by using the weight that realizes the most effective relocation. In other words, an effective relocation recommendation process (recommendation algorithm) can be realized. As a result, the simulation accuracy can be improved.

In the simulation device 10, all ports included in the non-target area are virtually treated as one virtual port, and movement of vehicles between the plurality of target ports included in the target area and the virtual port is simulated. Specifically, a vehicle moving from a target port of the target area to a port of the non-target area is regarded as a vehicle rented from the target port and returned to the virtual port. Similarly, a vehicle moving from a port in the non-target area to a target port in the target area is regarded as a vehicle rented from the virtual port and returned to the target port. In other words, only the movement of the vehicle in and out of the non-target area is simulated, and the simulation of the movement of the vehicle in the non-target area is omitted. Therefore, the calculation amount can be reduced as compared with the case where all ports included in the relocation area are considered. As a result, the calculation time can be shortened and the resources required for the calculation can be reduced.

The calculation unit 14 determines the number of vehicles to be rented and a return port to which each rental vehicle is returned for each of the plurality of target ports and the virtual port. According to this configuration, it is possible to simulate the movement of a vehicle between ports by a user.

In a shared traffic service, in general, a vehicle with a higher remaining battery level is more likely to be rented by a user. In order to reflect this tendency in the simulation, the calculation unit 14 determines a rental vehicle based on the remaining battery level of each vehicle parked in the target port. According to this configuration, the simulation can be performed in consideration of the remaining battery level, so that the simulation accuracy can be improved.

In the simulation device 10, vehicles parked in ports in the non-target area is excluded from the calculation target. That is, the port information of any port in the non-target area and the vehicle information of any vehicle existing in the non-target area are not used for the simulation of the target area. Therefore, the vehicle to be rented from the virtual port is not selected from the vehicles existing in the non-target area, but is newly generated as a virtual vehicle. Since the virtual vehicle does not have information on the remaining battery level, the calculation unit 14 determines the remaining battery level of the vehicle to be rented from the virtual port based on the remaining battery levels of the vehicles existing in the non-target area. With this configuration, it is possible to determine the remaining battery level of the vehicle to be rented from the virtual port. As a result, the simulation accuracy can be improved.

The calculation unit 14 determines the battery usage of the rental vehicle based on the rental port and the return port. Since the battery usage of the rental vehicle can be predicted from the combination of the rental port and the return port, the battery usage can be accurately determined according to the above-described configuration. Then, for example, by subtracting the battery usage from the remaining battery level of the rental vehicle, it is possible to calculate the remaining battery level after the rental vehicle is returned. Therefore, since it is possible to simulate the change with time of the remaining battery level of each vehicle, the simulation accuracy can be improved.

As described above, according to the simulation device 10, the simulation of the movement of the vehicle between the plurality of ports in the shared traffic service can be performed at a high speed and can be made closer to the reality.

Although embodiments of the present disclosure have been described above, the present disclosure is not limited to the above-described embodiments.

The simulation device 10 may be configured by a single device coupled physically or logically, or may be configured by two or more devices that are physically or logically separated from each other. For example, the simulation device 10 may be implemented by a plurality of computers distributed over a network such as cloud computing. As described above, the configuration of the simulation device 10 may include any configuration that can realize the functions of the simulation device 10.

The simulation device 10 only needs to simulate the movement of the vehicle between the plurality of ports included in the relocation area, and does not have to select the target area. In this case, the relocation area does not have to be divided into divided areas, and the simulation device 10 does not have to include the selection unit 12.

The simulation device 10 does not have to optimize the weight for each of the plurality of parameters used in the relocation recommendation process. The calculation unit 14 may perform the relocation recommendation process using the weight designated by the user of the simulation device 10. In these cases, the simulation device does not have to include the adjustment unit 13 and the evaluation unit 15.

The user of the simulation device 10 may evaluate the weights. The adjustment unit 13 may determine an optimum weight for each parameter based on the evaluation result by the user. In this case, the simulation device 10 does not have to include the evaluation unit 15.

The work time $Tp_i$ includes at least the carrying time $Tc_i$. The work time $Tp_i$ does not have to include at least one of the basic work time $Tb_i$ and the maintenance time $Tm_i$. The work time $Tp_i$ may further include another time.

Instead of the map image data $M_i$, the calculation unit 14 may calculate the time required for one carrying work based on other information indicating the surrounding environment of the relocation port.

The parameters $X_{i,j}$ for determining the collection port may include a parameter relating to the work time $Tp_i$ in the i-th port. For example, this parameter takes a larger value as the work time $Tp_i$ is smaller. In this case, a collection port from which the vehicle can be effectively collected can be determined in consideration of the work time $Tp_i$. Similarly, the parameters $Y_{i,k}$ for determining the allocation port may include a parameter relating to the work time $Tp_i$ in the i-th port. For example, this parameter takes a larger value as the work time $Tp_i$ is smaller. In this case, an allocation port to which the vehicle can be effectively allocated can be determined in consideration of the work time $Tp_i$.

The battery usage information may be set for each user having the same attribute. As attributes of the user, for example, gender and age are used. In this case, the calculation unit 14 determines the attribute of the user who rents the rental vehicle by a known method. Then, the calculation unit 14 may determine the battery usage of the rental vehicle based on the user's attribute in addition to the rental port and the return port.

The usage time may vary depending on the purpose of use of the vehicle. For example, the usage time when the vehicle is used for sightseeing may be greatly different from the usage time when the vehicle is used on a daily basis. In order to consider the purpose of use of the vehicle, the calculation unit 14 may determine the usage time of each rental vehicle according to the mixed Poisson distribution of the usage time. For example, the calculation unit 14 estimates the parameter of the mixed Poisson distribution using a technique such as an Expect-Maximization (EM) algorithm from the past usage time for each combination of the rental port and the return port. Then, the calculation unit 14 calculates the usage time from a probability model using the estimated parameter.

Note that the block diagrams used in the description of the above embodiments show blocks of functional units. These functional blocks (components) are realized by any combination of at least one of hardware and software. The method for realizing each functional block is not particularly limited. That is, each functional block may be realized using a single device coupled physically or logically. Alternatively, each functional block may be realized using two or more physically or logically separated devices that are directly or indirectly connected to each other (e.g., in a wired manner, a wireless manner or the like). The functional blocks may be realized by combining the one device or the plurality of devices mentioned above with software.

Functions include judging, deciding, determining, calculating, computing, processing, deriving, investigating, searching, confirming, receiving, transmitting, outputting, accessing, resolving, selecting, choosing, establishing, comparing, assuming, expecting, considering, broadcasting, notifying, communicating, forwarding, configuring, reconfiguring, allocating, mapping, assigning, and the like. However, the functions are not limited thereto. For example, a functional block (component) for performing transmission is referred to as a transmitting unit or a transmitter. As explained above, the method for realizing any of the above is not particularly limited.

Figure 19:
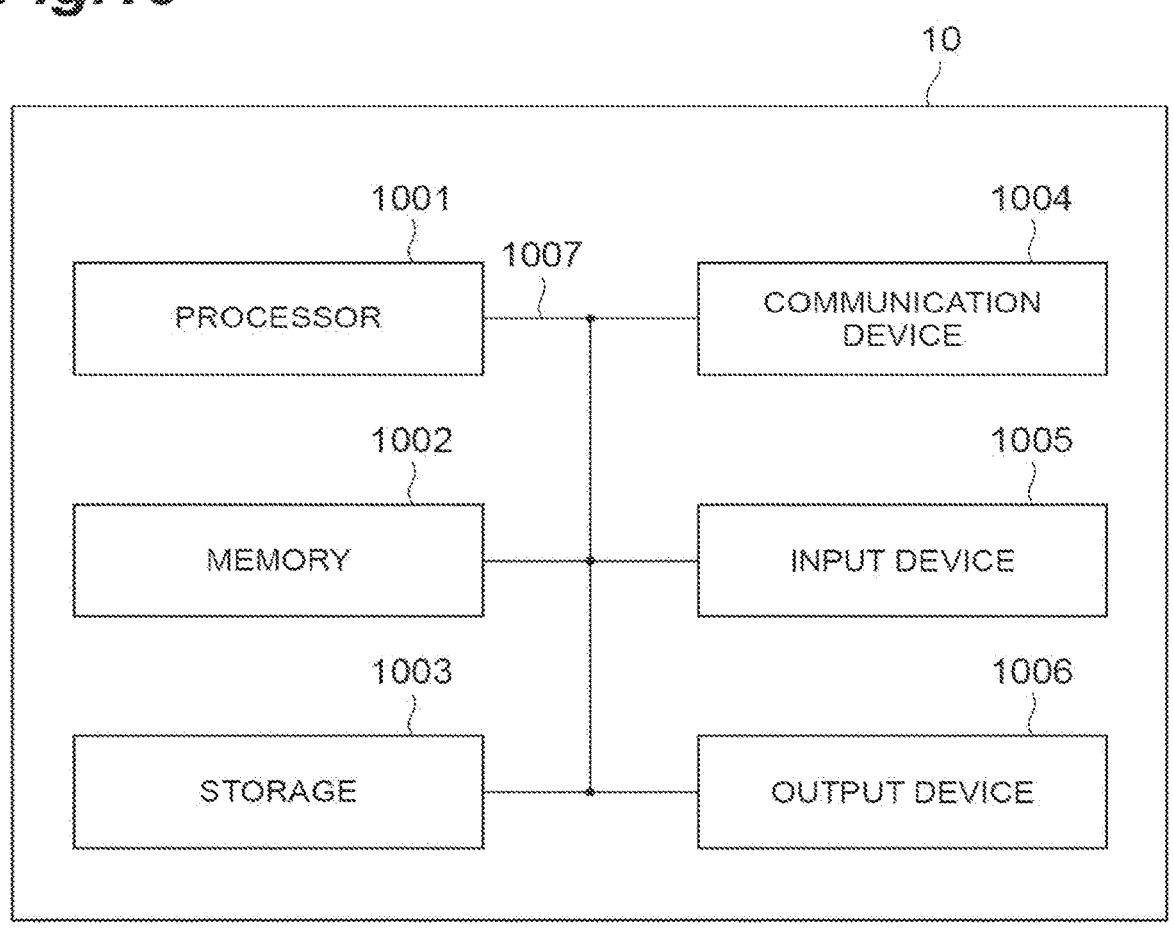
FIG. 19 is a diagram showing a hardware configuration of the simulation device shown in FIG. 1.

For example, the simulation device 10 according to one embodiment of the present disclosure may function as a computer performing the processes of the present disclosure. The hardware configuration of the simulation device 10 will be described below. FIG. 19 is a diagram showing an example of the hardware configuration of the simulation device 10 according to one embodiment of the present disclosure. The above-described simulation device 10 may be physically configured as a computer device including a processor 1001, a memory 1002, a storage 1003, a communication device 1004, an input device 1005, an output device 1006, a bus 1007, and the like.

In the following description, the term "device" can be read as a circuit, a device, a unit, etc. The hardware configuration of the simulation device 10 may be configured to include one or more of each device shown in the figure, or may be configured not to include some of the devices.

Each function of the simulation device 10 is realized by causing the processor 1001, by loading predetermined software (program) onto hardware such as the processor 1001 and the memory 1002, to perform computation to control the communication via the communication device 1004 and to control at least one of reading data from and writing data to the memory 1002 and the storage 1003.

The processor 1001 operates, for example, an operating system to control the entire computer. The processor 1001 may be configured by a central processing unit (CPU) including an interface with a peripheral device, a controller, an arithmetic unit, a register, and the like. For example, each function of the above-described simulation device 10 may be realized by the processor 1001.

The processor 1001 reads a program (program code), a software module, data, and the like from at least one of the storage 1003 and the communication device 1004 into the memory 1002, and executes various processes in accordance with these. As the program, a program for causing a computer to execute at least a part of the operations described in the above-described embodiments is used. For example, each function of the simulation device 10 may be realized by a control program stored in the memory 1002 and operating in the processor 1001. Although it has been described that the various processes described above are executed by a single processor 1001, the various processes may be executed simultaneously or sequentially by two or more processors 1001. The processor 1001 may be implemented by one or more chips. The program may be transmitted from a network via a telecommunication line.

The memory 1002 is a computer-readable recording medium, and, for example, may be configured by at least one of a read only memory (ROM), an erasable programmable ROM (EPROM), an electrically erasable programmable ROM (EEPROM), a random access memory (RAM) and the like. The memory 1002 may be referred to as a register, a cache, a main memory (main storage) or the like. The memory 1002 can store executable programs (program codes), software modules, and the like for performing the simulation method according to one embodiment of the present disclosure.

The storage 1003 is a computer-readable recording medium, and, for example, may be configured by at least one of an optical disc such as a compact disc ROM (CD-ROM), a hard disk drive, a flexible disk, a magneto-optical disc (e.g., a compact disc, a digital versatile disc, a Blu-ray (Registered Trademark) disc), a smart card, a flash memory (e.g., a card, a stick, a key drive), a floppy (Registered Trademark) disk, a magnetic strip, and the like. The storage 1003 may be referred to as an auxiliary storage. The recording medium described above may be, for example, a database, a server, or any other suitable medium that includes at least one of the memory 1002 and the storage 1003.

The communication device 1004 is hardware (transmission/reception device) for performing communication between computers through at least one of a wired network and a wireless network, and is also referred to as a network device, a network controller, a network card, a communication module, or the like. The communication device 1004 may include, for example, a high-frequency switch, a duplexer, a filter, a frequency synthesizer, and the like to realize at least one of frequency division duplex (FDD) and time division duplex (TDD). For example, the acquisition unit 11 and the like described above may be realized by the communication device 1004.

The input device 1005 is an input device (e.g., a keyboard, a mouse, a microphone, a switch, a button, a sensor, or the like) that accepts input from the outside. The output device 1006 is an output device (e.g., a display, a speaker, an LED lamp, etc.) that performs an output to the outside. The input device 1005 and the output device 1006 may be integrated as a touch panel, for example.

Devices such as the processor 1001 and the memory 1002 are connected to each other with the bus 1007 for communicating information. The bus 1007 may be configured using a single bus or using a separate bus for every two devices.

The simulation device 10 may include hardware such as a microprocessor, a digital signal processor (DSP), an application specific integrated circuit (ASIC), a programmable logic device (PLD), and a field programmable gate array (FPGA). Some or all of each functional block may be realized by the hardware. For example, the processor 1001 may be implemented using at least one of such hardware components.

Notification of information is not limited to the aspects/embodiments described in the present disclosure, and may be performed using other methods.

In the processing procedures, sequences, flowcharts, and the like of each of the aspects/embodiments described in the present disclosure, the order of processing may be interchanged, as long as there is no inconsistency. For example, the methods described in the present disclosure present the various steps using exemplary order and are not limited to the particular order presented.

Information and the like may be output from an upper layer to a lower layer or may be output from a lower layer to an upper layer. Information and the like may be input and output via a plurality of network nodes.

The input/output information and the like may be stored in a specific location (e.g., a memory) or may be managed using a management table. The information to be input/output and the like can be overwritten, updated, or added. The output information and the like may be deleted. The input information and the like may be transmitted to another device.

The determination may be performed by a value (0 or 1) represented by one bit, a truth value (Boolean: true or false), or a comparison of a numerical value (for example, a comparison with a predetermined value).

The aspects/embodiments described in the present disclosure may be used separately, in combination, or switched with the execution of each aspect/embodiment. The notification of the predetermined information (for example, notification of "being X") is not limited to being performed explicitly, and may be performed implicitly (for example, without notifying the predetermined information).

Although the present disclosure has been described in detail above, it is apparent to those skilled in the art that the present disclosure is not limited to the embodiments described in the present disclosure. The present disclosure may be implemented as modifications and variations without departing from the spirit and scope of the present disclosure as defined by the claims. Accordingly, the description of the present disclosure is for the purpose of illustration and has no restrictive meaning relative to the present disclosure.

Software, whether referred to as software, firmware, middleware, microcode, hardware description language, or other names, should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function, etc.

Software, an instruction, information, and the like may be transmitted and received via a transmission medium. For example, if software is transmitted from a website, a server, or any other remote source using at least one of wired technologies (such as a coaxial cable, an optical fiber cable, a twisted pair, and a digital subscriber line (DSL)) and wireless technologies (such as infrared light and micro-waves), at least one of these wired and wireless technologies is included within the definition of the transmission medium.

The information, signals, and the like described in the present disclosure may be represented using any of a variety of different technologies. For example, data, instructions, commands, information, signals, bits, symbols, chips, etc., which may be referred to throughout the above description, may be represented by voltages, electric currents, electro-magnetic waves, magnetic fields or particles, optical fields or photons, or any combination thereof.

It should be noted that terms described in the present disclosure and terms necessary for understanding the present disclosure may be replaced with terms having the same or similar meanings.

The terms "system" and "network" as used in the present disclosure are used interchangeably.

The information, parameters, and the like described in the present disclosure may be expressed using absolute values, relative values from a predetermined value, or other corre-sponding information.

The names used for the parameters described above are in no way restrictive. Further, the mathematical expressions and the like using these parameters may be different from those explicitly disclosed in the present disclosure.

The term "determining" as used in the present disclosure may encompass a wide variety of operations. For example, the term "determining" may be regarded as judging, calcu-lating, computing, processing, deriving, investigating, look-ing up, search, inquiry (e.g., searching in a table, a database, or another data structure), and ascertaining. Also, the term "determining" may be regarded as receiving (e.g., receiving information), transmitting (e.g., transmitting information), inputting, outputting, and accessing (e.g., accessing data in a memory). Also, the term "determining" may be regarded as resolving, selecting, choosing, establishing, comparing, and the like. That is, the term "determining" may be regarded as a certain type of action related to "determining". The term "determining" may be read as "assuming", "expecting", "considering", etc.

The term "connected", "coupled", or any variation thereof means any direct or indirect connection or coupling between two or more elements. One or more intermediate elements may be present between two elements that are "connected" or "coupled" to each other. The coupling or connection between the elements may be physical, logical, or a com-bination thereof. For example, "connection" may be read as "access". When "connect" or "coupling" is used in the present disclosure, the two elements may be considered to be "connected" or "coupled" to each other using one or more electrical wires, cables, printed electrical connections, and the two elements may be considered to be "connected" or "coupled" to each other using, as some non-limiting and non-exhaustive examples, electromagnetic energy having wavelengths in the radio frequency region, the microwave region, and light (both visible and invisible) regions.

The term "based on" as used in the present disclosure does not mean "based only on" unless otherwise specified. In other words, the term "based on" means both "based only on" and "based at least on".

Any reference to an element using the designations "first", "second", etc., as used in the present disclosure does not generally limit the amount or order of the element. Such designations may be used in the present disclosure as a convenient way to distinguish between two or more ele-ments. Thus, references to the first and second elements do not imply that only two elements may be adopted, or that the first element must precede the second element in any way.

The "unit" in the configuration of each of the above devices may be replaced with "circuit", "device", etc.

When "include", "including", and variations thereof are used in the present disclosure, these terms are intended to be inclusive, as well as the term "comprising". Furthermore, the term "or" as used in the present disclosure is intended not to be an exclusive OR.

In the present disclosure, where article such as "a", "an" and "the" in English is added by translation, the present disclosure may include that the noun following the article is plural.

In the present disclosure, the term "A and B are different" may mean that "A and B are different from each other". The term may mean that "each of A and B is different from C". Terms such as "separated" and "combined" may also be interpreted in a similar manner to "different".

REFERENCE SIGNS LIST

1 . . . simulation system, 10 . . . simulation device, 11 . . . acquisition unit, 12 . . . selection unit, 13 . . . adjustment unit, 14 . . . calculation unit, 15 . . . evaluation unit, 20 . . . management device, P . . . port, VPa . . . virtual port, R . . . relocation area, Ra to Rd . . . divided area.

The invention claimed is:

1. A system comprising:

a simulation device that simulates movement of a vehicle between a plurality of ports in a shared traffic service and that included processing circuitry configured to calculate a work time in a relocation port that is a port to be a target of relocation of the vehicle, and simulate the relocation based on the work time; and a management device configured to store port information including an actual number of vehicles available at a first time at each of the plurality of ports, and vehicle carrier trailer information including actual position information of a vehicle carrier trailer at the first time;

wherein the processing circuitry is configured to acquire the port information and the vehicle carrier trailer information from the management device and, based on the port information and the vehicle carrier trailer information, calculate the number of vehicles available at a second time later than the first time for each of the plurality of ports and the position infor-mation of the vehicle carrier trailer at the second time, and determine from among the plurality of ports, the relocation port based on the number of vehicles available at the second time for each of the plurality of ports and the position information of the vehicle carrier trailer at the second time, the work time includes a carrying time required for a worker to carry a target vehicle that is a vehicle to be relocated between a vehicle carrier trailer and the relocation port, the vehicle carrier trailer transporting the target vehicle between the relocation ports, the processing circuitry calculates the carrying time based on map image data indicating a map around the relocation port and by using a machine learning model which is learned by using map image data around a port as an explanatory variable and using a time required for one carrying work in the port as an objective variable, the work time includes a maintenance time for maintaining the relocation port, and the processing circuitry calculates the maintenance time based on an elapsed time that has elapsed since a worker visited the relocation port last time.

2. The system according to claim 1, wherein the processing circuitry calculates the carrying time further based on a number of the target vehicles, a number of vehicles that can be carried in one carrying work, and a time required for the one carrying work.

3. The system according to claim 1, wherein the processing circuitry calculates the maintenance time using a function that defines a relationship between the maintenance time and the elapsed time, and wherein the function is obtained from past maintenance times in the plurality of ports.

4. The system according to claim 1, wherein the processing circuitry determines a collection port that is the relocation port from which a target vehicle to be relocated is collected and an allocation port that is the relocation port to which the collected target vehicle is allocated by using a recommendation algorithm for recommending relocation.

5. The system according to claim 4, wherein the processing circuitry determines a number of vehicles to be relocated based on a number of surplus vehicles occurring in the collection port, a carriable number of vehicles that is the number of vehicles that can be accommodated in a vehicle carrier trailer that perform the relocation, and a number of insufficient vehicles occurring in the allocation port.

* * * * *